US012654483B2

(12) United States Patent
Kanbayashi et al.

(10) Patent No.: US 12,654,483 B2
(45) Date of Patent: Jun. 16, 2026

(54) OIL-BASED BALLPOINT PEN

(71) Applicant: KABUSHIKI KAISHA PILOT CORPORATION, Tokyo (JP)

(72) Inventors: Hironobu Kanbayashi, Tokyo (JP); Hidenori Kudou, Tokyo (JP); Toshihide Kawasaki, Tokyo (JP); Takahiro Joshita, Tokyo (JP)

(73) Assignee: KABUSHIKI KAISHA PILOT CORPORATION, Tokyo (JP)

( * ) Notice: Subject to any disclaimer, the term of this patent is extended or adjusted under 35 U.S.C. 154(b) by 760 days.

(21) Appl. No.: 18/008,913

(22) PCT Filed: Jun. 9, 2021

(86) PCT No.: PCT/JP2021/021902
§ 371 (c)(1),
(2) Date: Dec. 7, 2022

(87) PCT Pub. No.: WO2021/251429
PCT Pub. Date: Dec. 16, 2021

(65) Prior Publication Data
US 2023/0294446 A1 Sep. 21, 2023

(30) Foreign Application Priority Data
Jun. 12, 2020 (JP) ................................. 2020-102012

(51) Int. Cl.
B43K 7/01 (2006.01)
C09D 11/17 (2014.01)
C09D 11/18 (2006.01)

(52) U.S. Cl.
CPC ................ B43K 7/01 (2013.01); C09D 11/17 (2013.01); C09D 11/18 (2013.01)

(58) Field of Classification Search
CPC . B43K 7/01; B43K 1/082; B43K 7/02; C09D 11/17; C09D 11/18
See application file for complete search history.

(56) References Cited

U.S. PATENT DOCUMENTS

| | | |
|---|---|---|
| 2007/0051272 A1 | 3/2007 | Wheeler |
| 2010/0160554 A1 | 6/2010 | Okahira |
| 2011/0271870 A1 | 11/2011 | Otsubo et al. |

(Continued)

FOREIGN PATENT DOCUMENTS

| | | |
|---|---|---|
| CN | 102292403 A | 12/2011 |
| CN | 105492219 A | 4/2016 |

(Continued)

OTHER PUBLICATIONS

Machine translation of JP_2009292935 (Year: 2009).*

(Continued)

*Primary Examiner* — Doris L Lee
(74) *Attorney, Agent, or Firm* — Rimon P.C.

(57) ABSTRACT

An oil-based ballpoint pen includes: an ink container configured to accommodate an ink composition for the oil-based ballpoint pen, the ink composition containing colorant, alkylene glycol alkyl ether, and polyacrylic resin; and a ballpoint pen tip configured to rotatably hold a ball at one end thereof in an extending direction of the ink container. A ratio of an ink consumption (mg) per writing distance of 100 m to a diameter (mm) of the ball is 30 or more.

15 Claims, 2 Drawing Sheets

(56)　　　　References Cited

U.S. PATENT DOCUMENTS

| | | | |
|---|---|---|---|
| 2015/0071698 A1 | 3/2015 | Otsubo et al. | |
| 2016/0177114 A1 | 6/2016 | Shiobara et al. | |
| 2022/0363926 A1 | 11/2022 | Miyake et al. | |

FOREIGN PATENT DOCUMENTS

| | | | | |
|---|---|---|---|---|
| JP | H05-331403 | A | | 12/1993 |
| JP | H07-196971 | A | | 8/1995 |
| JP | 08311388 | A | * | 11/1996 |
| JP | 2007-176995 | A | | 7/2007 |
| JP | 2008-088264 | A | | 4/2008 |
| JP | 2009292935 | A | * | 12/2009 |
| JP | 2010-084040 | A | | 4/2010 |
| JP | 2011-153266 | A | | 8/2011 |
| JP | 2013-216822 | A | | 10/2013 |
| JP | 2015105339 | A | * | 6/2015 |
| JP | 2016147477 | A | * | 8/2016 |
| JP | 2017-095623 | A | | 6/2017 |
| JP | 2018-065917 | A | | 4/2018 |
| JP | 2019-131628 | A | | 8/2019 |
| JP | 2020-97645 | A | | 6/2020 |
| TW | 201511982 | A | | 4/2015 |
| WO | 2004/087817 | A1 | | 10/2004 |
| WO | 2013/031845 | A1 | | 3/2013 |
| WO | 2021/085457 | A1 | | 5/2021 |

OTHER PUBLICATIONS

Machine translation of JP_2015105339 (Year: 2015).*
Machine translation of JP_2016147477 (Year: 2016).*
Machine translation of JP_H08311388 (Year: 1996).*
Office Action dated Sep. 3, 2024 from corresponding Taiwanese Patent Application No. 110121210, 7 pages (non-English).
Office Action dated Feb. 12, 2025, issued in corresponding Japanese Patent Application No. 2022-530604, 6 pages.
International Search Report issued in corresponding International Patent Application No. PCT/JP2021/021902, filed Aug. 24, 2021, with English translation.
Extended European Search Report issued in the corresponding European patent Application No. 21822811.2 dated Jun. 12, 2024, w/ English Translation.
Notice of Reasons for Refusal received in corresponding Japanese Patent Application No. 2025-077271, mailed Feb. 24, 2026.

* cited by examiner

OIL-BASED BALLPOINT PEN

CROSS-REFERENCE OF RELATED APPLICATIONS

This application is the U.S. National Phase under 35 U.S.C. § 371 of International Patent Application No. PCT/JP2021/021902, filed on Jun. 9, 2021, which in turn claims the benefit of Japanese Application No. 2020-102012, filed on Jun. 12, 2020, the entire disclosures of which applications are incorporated by reference herein.

TECHNICAL FIELD

Embodiments described herein relate generally to an oil-based ballpoint pen.

BACKGROUND ART

The writing touch of a ballpoint pen is susceptible to the frictional resistance between a ball and a tip main body while writing with the ballpoint pen. In particular, a ballpoint pen, unlike other types of writing instruments, has a configuration in which a ballpoint pen tip, which includes a metal tip made of a stainless steel or the like at a distal end and a transfer ball made of a metal such as a super steel held in a ball socket of the metal tip, is attached to an ink container. There have been however drawbacks due to the rotation of the ball while writing such as the occurrences of blurs, point unevenness, and the like in handwriting, poor writing touch, and weeping and blobbing due to an ink residue at the tip end.

In order to solve such problems, there have been proposed plenty of ink compositions for oil-based ballpoint pen containing additives such as various lubricants with the aim of improving the lubricity for reducing the frictional resistance between the ball and the tip main body.

As an ink composition for oil-based ballpoint pen containing such additives, there is disclosed an oil-based ballpoint pen ink containing alkyl β-D-glucoside (see, e.g., JP H5-331403 A). There is also disclosed an ink composition for oil-based ballpoint pen containing a polyethylene glycol having an average molecular weight of 200 to 4000000 (see, e.g., JP H7-196971 A). Furthermore, an ink for oil-based ballpoint pen containing N-acylamino acid, N-acylmethyltauric acid, and/or N-acylmethylalanine is disclosed (see, e.g., JP 2007-176995 A). Moreover, there is also disclosed an oil-based ink composition for ballpoint pen, which contains at least: deca macadamia nut oil fatty acid decaglyceryl; and a polyoxyethylene alkyl ether, being solid at normal temperature, including an alkyl group having 16 or more carbon atoms (see, e.g., JP 2008-88264 A).

However, in the case of using various additives as in Patent Documents 1 to 4, the frictional resistance between the ball and the tip main body can be reduced to some extent, but there is room for improvement since the writing touch is not satisfactory, and the writability such as blurring or weeping and blobbing in handwriting have yet to be improved. Moreover, in the case of using a new lubricant or the like, depending on the compatibility with other ink components, the stability over time in the ink is prone to be affected.

An object of the present invention is to provide an oil-based ballpoint pen with an improved writing touch and an excellent writability with neither blurring nor weeping and blobbing in handwriting.

SUMMARY

According to an embodiment, an oil-based ballpoint pen includes: an ink container configured to accommodate an ink composition for the oil-based ballpoint pen, the ink composition containing colorant, alkylene glycol alkyl ether, and polyacrylic resin; and a ballpoint pen tip configured to rotatably hold a ball at one end thereof in an extending direction of the ink container, in which a ratio of an ink consumption (mg) per writing distance of 100 m to a diameter (mm) of the ball is 30 or more.

Effect of the Invention

According to the present invention, there has been able to obtain an oil-based ballpoint pen with an excellent writing touch and an excellent writability with neither blurring nor weeping and blobbing in handwriting.

DESCRIPTION OF EMBODIMENTS

Figure 1:
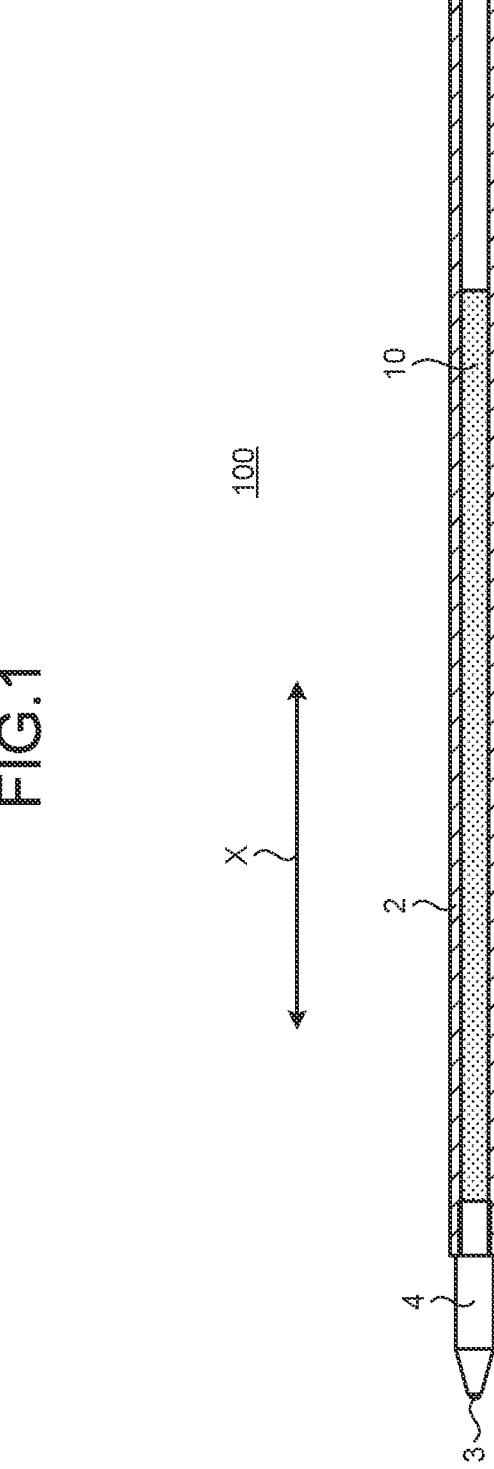
FIG. 1 is a cross-sectional view indicating an example of a ballpoint pen.

Exemplary embodiments of the present invention will be described in detail below. Note that in the present specification, "part", "%", "ratio" and the like indicated in a formulation are on a mass basis unless otherwise specified, and a content is indicated in percentage by mass of a constituent component based on the mass of an ink composition.

An oil-based ballpoint pen of the present invention includes an ink container and a ballpoint pen tip. The ink container accommodates an ink composition for oil-based ballpoint pen, the ink composition contains a colorant, an alkylene glycol alkyl ether, and a polyacrylic resin. The ballpoint pen tip rotatably holds a ball at one end of the ink container in its extending direction. The oil-based ballpoint pen of the present invention has a ratio of an ink consumption (mg) per writing distance of 100 m to a ball diameter (mm) of 30 or more.

It has been found that the ink composition for oil-based ballpoint pen contains an alkylene glycol alkyl ether and a polyacrylic resin, thereby imparting pseudoplasticity to lower the ink viscosity while writing, so that an excellent writing touch can be preserved. The reason for this is that the polyacrylic resin is swollen and dispersed in the alkylene glycol alkyl ether, thereby enabling to impart pseudoplasticity. Moreover, it has been found that when the ink composition for oil-based ballpoint pen of the present invention is used, and the ratio of the ink consumption (mg) per writing distance of 100 m to the ball diameter (mm) is 30 or more, the writability can also be improved with neither blurring, nor weeping and blobbing in handwriting. The term "weeping" in the wording "weeping and blobbing" refers to a phenomenon in which an excess ink while writing is accumulated at the pen nib. The term "blobbing" in the wording "weeping and blobbing" refers to a phenomenon in which an excess ink while writing is left like a blob on the writing surface.

Hereinafter, details of each component contained in the ink composition for oil-based ballpoint pen and the oil-based ballpoint pen will be described in detail. First, details of each component contained in the ink composition for oil-based ballpoint pen will be described. Note that, in the present embodiment, the ink composition for oil-based ballpoint pen may be described by referring to it as an ink composition or an ink. Also, the oil-based ballpoint pen may be simply referred to as a ballpoint pen.

(Alkylene Glycol Alkyl Ethers)

An alkylene glycol alkyl ether used in the present invention is a solvent having a function of swelling and dispersing a polyacrylic resin described later, thereby enabling to impart pseudoplasticity. It has been found that, when pseudoplasticity is imparted, the ink viscosity while writing is lowered, thereby improving the writing touch and suppressing blurring, weeping and blobbing in handwriting, so that an excellent writability can be preserved. In particular, when a crosslinked polyacrylic resin is used, a three-dimensional network structure tends to be formed by an alkylene glycol alkyl ether, and a denser crosslinked structure is likely to be formed. For this reason, the pseudoplasticity is easily imparted, this is effective for improving the writing touch and writability (suppression of blur in handwriting). Moreover, the crosslinked polyacrylic resin is effective, since an ink leakage from the gap between the ball and the tip end (writing tip portion) is easily suppressed. Furthermore, the crosslinked polyacrylic resin is less likely to wet the ballpoint pen tip made of a metal material, therefore the ink does not creep up from the tip end, and hence the ink residue does not occur, thereby suppressing the weeping and blobbing in handwriting, so that the writability can be improved.

In particular, when a ballpoint pen is used, a strong shearing is prone to be applied while writing, and an impact such as the shearing of a ball while writing temporarily resolves the pseudoplastic structure. For this reason, the ink viscosity is lowered, so that an excellent writing touch and writability (suppression of blur, weeping and blobbing) can be preserved, and the ink can be suitably used in ballpoint pens.

In the ink composition for oil-based ballpoint pen containing an alkylene glycol alkyl ether, a pigment is preferably used as a colorant. When a pigment is used as a colorant, with a three-dimensional network structure having a high density owing to the alkylene glycol alkyl ether, the pigment dispersibility is enhanced.

Examples of the alkylene glycol alkyl ethers include an alkylene glycol monoalkyl ether and an alkylene glycol dialkyl ether. Among them, an alkylene glycol monoalkyl ether is preferably used from the viewpoint of swelling and dispersion with a polyacrylic resin described later.

With respect to the number of carbon atoms in the alkylene glycol moiety of the alkylene glycol monoalkyl ether, the number of carbon atoms is preferably 2 or more and 10 or less in considering an easiness of swelling and dispersion with the polyacrylic resin, and writing touch and writability (suppression of blur, weeping and blobbing). The number of carbon atoms is 3 or more and 8 or less, and more preferably 5 or more and 6 or less in considering a more stabilized tendency with the polyacrylic resin and an easiness of achieving the above-described effect.

With respect to the number of carbon atoms in the alkyl ether moiety of the alkylene glycol monoalkyl ether, a shorter alkyl ether moiety is preferable in considering the swelling and dispersion with the polyacrylic resin, writing touch and writability (suppression of blur, weeping and blobbing). For this reason, the number of carbon atoms is preferably 1 or more and 6 or less, and in considering a more stabilized tendency with the polyacrylic resin and an easiness of achieving the effect, it is more preferably 1 or more and 4 or less, and further preferably 1 or more and 2 or less.

With respect to the alkylene glycol monoalkyl ether, its solubility parameter (SP value) is preferably 8 $(cal/cm^3)^{1/2}$ or more and 13 $(cal/cm^3)^{1/2}$ or less. This is because the dissolution stability and dispersion stability of the colorant are improved, and the swelling and dispersion with the polyacrylic resin is less likely to be affected. In more consideration, the solubility parameter (SP value) is preferably 9 $(cal/cm^3)^{1/2}$ or more and 12 $(cal/cm^3)^{1/2}$ or less, and in furthermore consideration, the solubility parameter (SP value) is preferably 10 $(cal/cm^3)^{1/2}$ or more and 11 $(cal/cm^3)^{1/2}$ or less.

The solubility parameter (SP value) of a solvent used in the present invention is a value represented by the square root of a molecular cohesive energy, and is stated in Polymer HandBook (Second Edition), Chapter IV, Solubility Parameter Values, the values in the handbook are used. The value is in the unit of $(cal/cm^3)^{1/2}$ and at 25° C.

Note that, for substances whose data are not written in the handbook, it can be calculated by a method by R. F. Fedors, in Polymer Engineering Science, 14, p 147 (1967).

The boiling point of the alkylene glycol monoalkyl ether is preferably 170° C. or higher. This is because when the boiling point is lower than 170° C. the alkylene glycol monoalkyl ether is volatile, the swelling and dispersion with the polyacrylic resin is prone to be affected with time, and the ink viscosity tends to increase. In more consideration, the boiling point is preferably 220° C. or higher. On the other hand, when the boiling point exceeds 300° C., the dryness of handwriting is liable to be affected. For this reason, the boiling point is preferably 300° C. or lower, and in more consideration, the boiling point is preferably 280° C. or lower.

Examples of the alkylene glycol monoalkyl ether include ethylene glycol monomethyl ether, ethylene glycol monoethyl ether, ethylene glycol monoisopropyl ether, ethylene glycol monobutyl ether, ethylene glycol monohexyl ether, diethylene glycol monomethyl ether, diethylene glycol monoethyl ether, diethylene glycol monoisopropyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, propylene glycol monomethyl ether, propylene glycol monoethyl ether, dipropylene glycol monomethyl ether, dipropylene glycol monoethyl ether, those having a butylene glycol monomethyl ether structure, and those having a butylene glycol monoethyl ether structure. These may be used alone or in combination of two or more.

Examples of the alkylene glycol dialkyl ether include ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, those having a dibutylene glycol dimethyl ether structure, and those having a dibutylene glycol diethyl ether structure. These may be used alone or in combination of two or more.

The content of the alkylene glycol alkyl ether is preferably 50% or more based on the content of all solvents in the ink composition for oil-based ballpoint pen, and the alkylene glycol alkyl ether is preferably used as a main solvent. This is based on a reason that other solvents are liable to interfere the swelling and dispersion of the polyacrylic resin, whereby the ink is less likely to have pseudoplasticity, as a result the writing touch and writability (suppression of blur, weeping and blobbing) are affected. Using of the alkylene glycol alkyl ether as a main solvent enables to prevent other solvents from affecting on the swelling and dispersion. In more considering the writability, the alkylene glycol alkyl ether content is preferably 70% or more based on the total solvent content. In more consideration of writability and the stability over time in ink, the content is preferably 90% or more. In more consideration of these effects, only alkylene glycol alkyl ethers are preferably used as the solvent.

The alkylene glycol alkyl ether content is preferably 10% by mass or more and 80% by mass or less based on the total amount of the ink composition. This is because when the content is less than 10% by mass, the swelling and dispersion effect of the polyacrylic resin is difficult to be obtained, the ink viscosity in the stationary state is less likely to increase, the ink leakage is difficult to be suppressed, and when the content is more than 80% by mass, the ink stability over time tends to be compromised. Furthermore, in consideration of the above effect, the content is preferably 20% by mass or more and 80% by mass or less, and in more consideration, preferably 30% by mass or more and 75% by mass or less.

(Polyacrylic Resin)

The polyacrylic resin used in the present invention is for use as a thickener. The polyacrylic resin has an affinity with an alkylene glycol alkyl ether, and is swollen and dispersed thereby providing a stable thickening action having pseudoplasticity. Furthermore, in considering the writing touch and writability (suppression of blur, weeping and blobbing in handwriting), a crosslinked polyacrylic resin is preferably used. This is because the crosslinked polyacrylic resin per se has a crosslinked structure, and a further sterically three-dimensional network structure is likely to be formed with use of alkylene glycol alkyl ether solvent. For this reason, when a denser crosslinked structure is formed, pseudoplasticity is easily imparted, thereby lowering the ink viscosity while writing, so that the writing touch and writability (suppression of blur, weeping and blobbing) and the like are easily improved. In particular, carboxyvinyl polymers are preferable.

With regard to the polyacrylic resin, the carboxyl group content in the polyacrylic resin is preferably 40% by mass or more and 80% by mass or less in considering that a stable thickening action with an alkylene glycol alkyl ether can be obtained. In more consideration, the content is preferably 50% by mass or more and 70% by mass or less. In particular, in the case of using an alkylene glycol monoalkyl ether as the alkylene glycol alkyl ether, a polyacrylic resin having a carboxyl group content of 55% by mass or more and 65% by mass or less is preferably used since it is excellent in swelling and dispersion, and imparts pseudoplasticity, thereby lowering the ink viscosity while writing to easily improve writing touch. Furthermore, this is more preferable in the case of using an alkylene glycol monomethyl ether.

The bulk specific gravity (g/ml) of the polyacrylic resin is preferably 0.5 (g/ml) or less. This is because the polyacrylic resin has an excellent swelling and dispersion for an alkylene glycol alkyl ether and water, thereby more easily producing the effect of the present invention. In more consideration, it is preferably 0.3 (g/ml) or less. On the other hand, when the bulk specific gravity (g/ml) of the polyacrylic resin is less than 0.01 (g/ml), the swelling and dispersion is difficult to be obtained, and the polyacrylic resin tends to aggregate. For this reason, it is preferably 0.01 (g/ml) or more, and in more consideration, it is preferably 0.1 (g/ml) or more.

The bulk specific gravity can be measured by, for example, a bulk specific gravity measuring device (Scott Volumeter: manufactured by Tsutsui Scientific Instruments Co., Ltd.).

When the polyacrylic resin content is less than 0.1% by mass based on the total amount of the ink composition, the swelling is insufficient, and pseudoplasticity cannot be imparted, and hence the improvement of writing touch is difficult to be obtained, and when the content is more than 5.0% by mass, the swelling and dispersion is poor in the ink, and hence the content is preferably 0.1% by mass or more and 5.0% by mass or less based on the total amount of the ink composition. Furthermore, in more considering the writing touch and the like, the content is preferably 0.3% by mass or more and 3.0% by mass or less, in more consideration, the content is preferably 0.6% by mass or more and 1.8% by mass or less.

In the present invention, the blending ratio of the alkylene glycol alkyl ether to the polyacrylic resin (alkylene glycol alkyl ether/polyacrylic resin) is preferably 5 times or more and 150 times or less on a mass basis in considering swelling and dispersion. In considering more stable swelling and dispersion, the blending ratio is more preferably 10 times or more and 120 times or less, and in more consideration, the blending ratio is more preferably 20 times or more and 100 times or less.

(Colorant)

The colorant to be used in the present invention is not especially limited to dyes, pigments, and the like, and can be appropriately selected and used.

Examples of dyes include oil-soluble dyes, acid dyes, basic dyes, and metal complexed dyes, and examples of various types of salt-forming dyes of these dyes include salt-forming dyes of an acid dye and a basic dye, salt-forming dyes of an organic acid and a basic dye, and salt-forming dyes of an acid dye and an organic amine. These dyes may be used alone or in combination of two or more thereof. As the dye, in consideration of stability over time based on the compatibility with an alkylene glycol alkyl ether, at least a salt-forming dye is preferably used, and in considering that stability over time can be maintained when salt-forming bond is stable, there are preferably used a salt-forming dye of a basic dye and an organic acid, a salt-forming dye of an acidic dye and a basic dye, and a salt-forming dye of an acidic dye and an organic amine. The salt-forming dye as described above is preferable because the dissolution stability is easily achieved in an alkylene glycol monoalkyl ether having a solubility parameter (SP value) of 8 $(cal/cm^3)^{1/2}$ or more and 13 $(cal/cm^3)^{1/2}$ or less. In more consideration, the solubility parameter (SP value) of the alkylene glycol monoalkyl ether is preferably 9 $(cal/cm^3)^{1/2}$ or more and 12 $(cal/cm^3)^{1/2}$ or less, and more preferably 10 $(cal/cm^3)^{1/2}$ or more and 11 $(cal/cm^3)^{1/2}$ or less.

Specific examples thereof include: Valifast Black 1802, Valifast Black 1805, Valifast Black 1807, Valifast Violet 1701, Valifast Violet 1704, Valifast Violet 1705, Valifast Blue 1601, Valifast Blue 1605, Valifast Blue 1613, Valifast Blue 1621, Valifast Blue 1631, Valifast Red 1320, Valifast Red 1355, Valifast Red 1360, Valifast Yellow 1101, Valifast Yellow 1151, Nigrosine Base EXBP, Nigrosine Base EX, BASE OF BASIC DYES ROB-B, BASE OF BASIC DYES RO6G-B, BASE OF BASIC DYES VPB-B, BASE OF BASIC DYES VB-B, BASE OF BASIC DYES MVB-3 (all above are manufactured by Orient Chemical Industries Co., Ltd.), Aizen Spilon Black GMH-special, Aizen Spilon Violet C-RH, Aizen Spilon Blue GNH, Aizen Spilon Blue 2BNH, Aizen Spilon Blue C-RH, Aizen Spilon Red C-GH, Aizen Spilon Red C-BH, Aizen Spilon Yellow C-GNH, Aizen Spilon Yellow C-2GH, S.P.T. Blue 111, S.P.T. Blue GLSH-Special, S.P.T. Red 533, S.P.T. Orange 6, S.B.N. Yellow 510, S.B.N. Yellow 530, and S.R.C-BH (all above are manufactured by Hodogaya Chemical Co., Ltd.). These may be used alone or in combination of two or more.

Examples of the pigment include inorganic, organic, and processed pigments, and specific examples thereof include carbon black, aniline black, ultramarine, chrome yellow, titanium oxide, iron oxide, phthalocyanine-based, azo-based, quinacridone-based, diketopyrrolopyrrole-based, quinophthalone-based, threne-based, triphenylmethane-based, perinone-based, perylene-based, dioxazine-based, metallic pigments, pearl pigments, fluorescent pigments, and phosphorescent pigments. These may be used alone or in combination of two or more.

As the colorant, a pigment is preferably used. This is because, in the case of ballpoint pens, pigment particles enter into a gap between a ball and a tip main body, as a result a bearing-like action tends to work, thereby preventing a metal contact, so that lubricity is enhanced, writing touch is improved, and an effect of reducing the wear of a ball socket is likely to be obtained. As in the present invention, the use of pigment is more preferable since when an alkylene glycol alkyl ether or a polyacrylic resin is used to impart pseudoplasticity, the ink viscosity while writing is reduced and the writing touch can be improved.

When a pigment is used as the colorant, the lubricity is easily maintained and writing touch is likely to be improved particularly by a synergistic effect based on a bearing action between the lubricating layer and the pigment particles owing to the surfactant. In considering the gap relationship inside the ballpoint pen tip, the average particle size of the pigment is preferably 1 nm or more and 500 nm or less. The average particle size is more preferably 30 nm or more and 350 nm or less, and still more preferably 50 nm or more and 300 nm or less.

The average particle size is determined by a laser diffraction method. Specifically, the average particle size can be determined from a particle size (D50) at 50% in volume-based cumulative particle size distributions measured based on a numerical value calibrated using a standard sample or another measurement method with use of a laser diffraction particle size distribution analyzer (trade name: Microtra-cHRA 9320-X100, Nikkiso Co., Ltd.).

Note that, the pigment exerts the above-mentioned action and effect in a dispersed state of the pigment in the ink composition for oil-based ballpoint pen, and hence it is preferable to determine the particle size in the dispersed state. Furthermore, the pigment is less resolvable even when wetted with water or alcohol, and is difficult to be chemically decomposed even when irradiated with light (sunlight), so that the visual recognition of handwriting is possible. For this reason, it is also suitable from the viewpoint of enabling to obtain an ink composition excellent in durability. The durability stands for water resistance, alcohol resistance, and light stability. Furthermore, a pigment is preferably used as the colorant from the viewpoint of easily obtaining an effect of preventing ink leakage.

As the colorant, a dye and a pigment may be used in combination. When a dye and a pigment are used in combination, while obtaining vivid color developability and improving the durability, the lubricity is improved, the writing touch is improved, and the wear of the ball socket can be reduced. In more considering the above-described effects and ink stability over time, a salt-forming dye and a pigment are preferably used in combination.

The total content of the colorants is preferably 5% by mass or more and 45% by mass or less based on the total amount of the ink composition. This is because when the total content is less than 5% by mass, a dark handwriting tends to be difficult to be obtained, and when the total content is more than 45% by mass, there is a tendency that the solubility in the ink tends to be affected. Therefore, in more considering the tendency, the total content is preferably 5% by mass or more and 35% by mass or less, and in furthermore consideration, the total content is 6% by mass or more and 30% by mass or less.

In the present invention, the ink composition for oil-based ballpoint pen preferably contains water. Although the reason for this is not clear, water is excellent in affinity with an alkylene glycol alkyl ether as well as with a polyacrylic resin. For this reason, this is because water can impart a higher thickening action and a stable swelling property for the swelling and dispersion with an alkylene glycol alkyl ether and a polyacrylic resin. Furthermore, this is because water improves an ink dischargeability while enhancing the slippage of a ball, and easily enhancing writability with suppressing point unevenness, weeping and blobbing, blur, and the like.

When the water content is less than 0.1% by mass based on the total amount of the ink composition, the ball slippage and the ink dischargeability tend to be affected. When the water content is more than 20% by mass, the solubility in ink tends to be poor. For this reason, the water content based on the total amount of the ink composition is preferably 0.1% by mass or more and 20% by mass or less. Furthermore, in considering the solubility in ink and writability (suppression of blur, weeping and blobbing), the water content is preferably 1% by mass or more and 10% by mass or less, and in more consideration, the water content is preferably 2% by mass or more and 10% by mass or less.

In the present invention, the blending ratio of water to the polyacrylic resin (water/polyacrylic resin) is preferably 0.1 times or more and 20 times or less on a mass basis in considering that high thickening action is achieved based on swelling and dispersion with an alkylene glycol alkyl ether and the polyacrylic resin. In considering that the writing touch and writability (suppression of blur, weeping and blobbing) are more easily improved in a well-balanced manner, the blending ratio of water is more preferably 1 time or more and 15 times or less, and in more consideration, the blending ratio of water is preferably 1 time or more and 10 times or less.

(Organic Amine)

In the present invention, an organic amine is preferably used because the polyacrylic resin is neutralized and stabilized with the organic amine so as to be sufficiently swelled and dispersed whereby a stable thickening action is easily obtained. Furthermore, an organic amine is preferably used even in a case where a surfactant such as a phosphate ester-based surfactant is used because the polyacrylic resin is neutralized with the organic amine so as to be dissolved and stabilized in ink whereby an effect of improving the writing touch and writing performance can be easily obtained. Examples of the organic amine include: amines having ethylene oxide, such as oxyethylene alkylamine and polyoxyethylene alkylamine; aliphatic amines such as alkylamines (laurylamine, stearylamine, etc.), distearylamine, and dimethylalkylamines (dimethyllaurylamine, dimethyl-stearylamine, dimethyloctylamine, etc.); and alkanolamines such as diethanolamine and triethanolamine. Among them, an amine having ethylene oxide is preferable in considering the stability with the polyacrylic resin. These may be used alone or in combination of two or more.

The amine having ethylene oxide preferably has an average mole number of ethylene oxide added (for one amine molecule) (EO number) of 1 or more and 30 or less, and in more consideration, the EO number is more preferably 4 or more and 20 or less. When the EO number is within the above-described range, the polyacrylic resin is neutralized and stabilized by the dissolution stability with an alkylene glycol alkyl ether, and a stable thickening action is easily obtained.

Furthermore, the total amine value of the organic amine is preferably 300 (mgKOH/g) or less in considering the stability with an alkylene glycol alkyl ether, polyacrylic resin, colorant, and other components. When the content is more than 300 (mgKOH/g), the organic amine has a strong reactivity, and hence is likely to react with the above-described components, whereby the ink stability over time is prone to be deteriorated. Furthermore, in considering the stability with an alkylene glycol alkyl ether and the polyacrylic resin, the total amine value is preferably 200 (mgKOH/g) or less, and in more consideration, preferably 150 (mgKOH/g) or less. On the other hand, in considering the above-described effect, the lower limit of the total amine value is preferably 30 (mgKOH/g) or more.

Note that the total amine value is defined as an indication of the total amount of primary, secondary, and tertiary amines, and as represented by the number of milligrams of potassium hydroxide equivalent to the hydrochloric acid required to neutralize one gram of a sample.

The HLB value of the organic amine is preferably 5 or more and 17 or less. The reason for this is that the polyacrylic resin is neutralized and stabilized so as to stabilize the swelling and dispersion with an alkylene glycol alkyl ether, whereby a stabilized thickening action can be obtained. In more considering the neutralization and stabilization and the improvement of swelling and dispersion, the HLB value is preferably 7 or more and 17 or less, and in furthermore consideration, the HLB value is preferably 9 or more and 16 or less.

In the present invention, the blending ratio of the organic amine to the polyacrylic resin (organic amine/polyacrylic resin) is preferably 0.1 times or more and 10 times or less, more preferably 0.3 times or more and 5 times or less, and preferably 0.5 times or more and 3 times or less on a mass basis. The reason for this is that the polyacrylic resin is neutralized and stabilized so as to stabilize the swelling and dispersion with an alkylene glycol alkyl ether, whereby a stabilized thickening action can be obtained.

The organic amine content is preferably 0.1% by mass or more and 10% by mass or less based on the total amount of the ink composition in considering neutralization and stabilization with the polyacrylic resin and a phosphate ester-based surfactant to be described below. Furthermore, in considering the neutralization for a phosphate ester-based surfactant to be described below, the organic amine content based on the total amount of the ink composition is preferably 0.1% by mass or more and 8% by mass or less, and in more consideration, preferably 1% by mass or more and 6% by mass or less.

(Surfactant)

In the present invention, a surfactant is preferably used in considering that an enhanced lubricity tends to improve the writing touch and improves the writing performance when a tip end portion is dried in a state where the tip end portion is left in the atmosphere. This is because a lubricating layer formed by a surfactant tends to improve the lubricity, and a coating formed by drying at the tip end is softened by the surfactant, thereby enabling to improve the writing performance.

Examples of the surfactant include fatty acids, silicone-based surfactants, fluorine-based surfactants, phosphate ester-based surfactants, acetylene bond-containing surfactants, fatty acid esters, polyalkylene alkyl ethers, alkylimidazolines, alkylalkanolamides, and oxyethylene-oxypropylene block copolymers. Among them, in considering the above-described effects, it is preferable to use one or more among fatty acids, phosphate ester-based surfactants, and fatty acid esters.

In particular, when used in a ballpoint pen, the phosphate ester-based surfactant tends to adsorb to ballpoint pen tips and balls as metals since the phosphate ester-based surfactant has a phosphate group, so that a lubricating effect is likely to be obtained, therefore a phosphate ester-based surfactant is preferably used. In addition, when used in a ballpoint pen, a phosphate ester-based surfactant is preferable because an extreme pressure effect is likely to be produced between a ball as a metal material and a ball socket, thereby further enhancing lubricity.

Regarding the HLB value of the surfactant, in considering the compatibility with an alkylene glycol alkyl ether and the polyacrylic resin, the HLB value is preferably 5 or more and 17 or less since swelling and dispersion with an alkylene glycol alkyl ether and the polyacrylic resin is less likely to be interfered. In consideration of further improvement in swelling and dispersion, lubricity, and writing performance, the HLB value is preferably 6 or more and 14 or less. Furthermore, in considering lubricity, the HLB value is preferably 12 or less, and the HLB value is preferably 6 or more and 12 or less.

Note that the HLB value used in the present invention can be determined by Griffin's method, Kawakami's method, or the like. In particular, in retractable writing instruments such as knock-type retractable writing instruments and rotary retractable writing instruments, unlike cap-type writing instruments, the pen nib is always exposed to the outside. For this reason, a surfactant having the above-described HLB value is more preferably used since the writing performance is likely to be affected when the writing tip end portion is dried.

Specific examples of the surfactant include fatty acids such as oleic acid, stearic acid, and linoleic acid. Examples of the silicone-based surfactant include dimethyl silicone, methyl phenyl silicone, polyether-modified silicone, and higher fatty acid ester-modified silicone. Examples of the fluorine-based surfactant include perfluoro group butyl sulfonate, perfluoro group-containing carboxylate, perfluoro group-containing phosphate, perfluoro group-containing phosphate type compound, perfluoroalkyl betaine, and perfluoroalkylamine oxide compound. Examples of the phosphate ester-based surfactant include phosphate monoester of polyoxyethylene alkyl ether or of polyoxyethylene alkyl aryl ether, phosphate diester of polyoxyethylene alkyl ether or of polyoxyethylene alkyl aryl ether, phosphate triester of polyoxyethylene alkyl ether or of polyoxyethylene alkyl aryl ether, alkyl phosphoric acid ester, alkyl ether phosphoric acid ester, and derivatives thereof.

Among them, a phosphate ester-based surfactant is preferably used in considering lubricity and thickening action.

When a phosphate ester-based surfactant is used, the acid value is preferably 180 (mgKOH/g) or less. This is because the improvement in lubricity by the phosphate ester-based surfactant is likely to exert and the thickening action of the polyacrylic resin is easily obtained. In considering lubricity and thickening action, the acid value is preferably 30 (mg-KOH/g) or more and 170 (mgKOH/g) or less. In more consideration, the acid value is preferably 70 (mgKOH/g) or more and 160 (mgKOH/g) or less.

Note that the acid value is represented by the number of milligrams of potassium hydroxide required to neutralize an acidic component contained in one gram of a sample.

The phosphate ester-based surfactant has an antirust effect. For this reason, when the ball is made of a metal, the phosphate ester-based surfactant is preferable since the corrosion of a ball is suppressed, an excellent writing touch is favorably maintained, and the wear of a ball socket is reduced. The phosphate ester-based surfactant is preferable, in particular when the ball is made of an alloy containing cobalt, nickel, chromium, or the like, since these metals are less likely to be corroded over time owing to the antirust effect of the phosphate ester-based surfactant. This tendency is remarkable and favorable in a case where as a ball material a cemented carbide is used for the ball, particularly where a cemented carbide ball containing: tungsten carbide as a main component; and cobalt, nickel, chromium, or the like as a binder.

Furthermore, in considering lubricity and ink stability over time, a phosphate ester-based surfactant having an alkyl group is preferably used, and in particular, the number of carbon atoms contained in the alkyl group is preferably 8 or more and 18 or less. In more consideration, the number of carbon atoms is more preferably 10 or more and 18 or less, and in more consideration, the number of carbon atoms is preferably 12 or more and 18 or less. This is because when the number of carbon atoms in the alkyl group is excessively small, the lubricity tends to be insufficient, and when the number of carbon atoms is excessively large, the ink stability over time tends to be affected.

The surfactant content is more preferably 0.1% by mass or more and 5.0% by mass or less based on the total amount of the ink composition. This is because when the content is less than 0.1% by mass, desired lubricity is less likely to be obtained, and when the content is more than 5.0% by mass, the ink tends to be unstable over time. In considering this tendency, the surfactant content based on the total amount of the ink composition is preferably 0.3% by mass or more and 3.0% by mass or less, and in more consideration, preferably 0.5% by mass or more and 3.0% by mass or less based on the total amount of the ink composition.

In the present invention, an organic solvent other than alkylene glycol alkyl ethers may be used. Specifically, an organic solvent generally used as oil-based ink can be exemplified, and examples thereof include: glycol solvents such as ethylene glycol monophenyl ether, diethylene glycol, triethylene glycol, polyethylene glycol, propylene glycol, dipropylene glycol, butylene glycol, and ethylene glycol; and alcohol solvents such as benzyl alcohol, methanol, ethanol, 1-propanol, 2-propanol, isopropanol, isobutanol, t-butanol, propargyl alcohol, allyl alcohol, 3-methyl-1-butyn-3-ol, ethylene glycol monomethyl ether acetate, and other higher alcohols.

The organic solvent content is preferably 3% by mass or more and 50% by mass or less based on the total amount of the ink composition in considering improving solubility, handwriting dryness, blur, and the like. In considering the dryness at the tip end, the content is preferably 5% by mass or more and 50% by mass or less, and more preferably 5% by mass or more and 30% by mass or less.

(Resin)

In the present invention, a resin may be used as an ink viscosity modifier, or in order to improve the suppression of ink leakage, to improve writing touch, to suppress blur and point unevenness in handwriting, or to easily improve pigment dispersibility. Examples of the resin include: polyvinyl butyral resins, ketone resins, polyacetal resins, polyvinyl alcohol resins, cellulose resins, terpene resins, alkyd resins, phenoxy resins, polyvinyl acetate resins, polyvinyl pyrrolidone resins, ethylene oxide polymers; and resin particles such as acrylic ester resin particles and amino resin particles. These may be used alone or in combination of two or more. The point unevenness refers to a phenomenon in which a writing line is intermittently written as fine points.

Among these resins, a ketone resin or a polyvinyl butyral resin is preferably used in considering the improvement of ink leakage suppression, the improvement of writing touch, the improvement of writability such as suppression of blur and point unevenness in handwriting, and an easiness to improve the pigment dispersibility. Furthermore, a ketone resin is preferably used in considering an improvement of writing touch, and an improvement of writability such as suppression of blur and point unevenness in handwriting.

The polyvinyl butyral resin is obtained by reacting polyvinyl alcohol (PVA) with butyraldehyde (BA), and has a structure having a butyral group, an acetyl group, and a hydroxyl group.

Among these resins, in considering the suppressing of ink leakage, the resin preferably contains resin particles, and furthermore preferably contains acrylic ester resin particles and amino resin particles. This is because a physical hindrance by the resin particles is caused in the gap between the ball and the inner wall of the tip end, thereby enabling to suppress ink leakage. Furthermore, the particles are partially deformed and adhere to each other, thereby generating a structure formed by weak aggregation. A structure having a high resistance action against an ink leakage in a stationary state is formed in the ink, thereby enabling a highly suppression of ink leakage. On the other hand, the structure is formed by weak aggregation, and hence the aggregated structure is disassembled by a physical action such as ball rotation while writing. For this reason, an ink fluidity while writing is not hindered and a favorable writing is allowed so that a dark handwriting can be obtained. In addition, the resin particles are suitably used, since the resin particles are also stable against an alkylene glycol alkyl ether, so that ink stability over time is maintained, and furthermore high solvent resistance and water resistance is provided to handwriting.

With respect to the average particle size of the resin particles, the smaller the average particle size, the more likely the particles adhere to each other to form a weak aggregated structure, so that ink leakage is easily suppressed. From this viewpoint, the average particle size of the resin particles is preferably 5 μm or less, and more preferably 3 μm or less. Furthermore, in considering the dispersion stability of the resin particles in the ink (ink stability over time), the average particle size of the resin particles is preferably 2 μm or less, and in more consideration, preferably less than 1 μm. On the other hand, when the average particle size is too small, an effect of suppressing ink leakage is prone to be poor. For this reason, the average particle size of the resin particles is preferably 0.1 μm or more, and more preferably 0.3 μm or more. Note that the average particle size of the resin particles can be determined by the Coulter counter method. Specifically, a Coulter Multisizer™3 (particle size analysis instrument manufactured by Beckman Coulter, Inc.) is used to measure a particle size (D50) at 50% in volume-based cumulative particle size distributions measured based on a numerical value calibrated using a standard sample or another measurement method. By this measurement, the average particle size of the resin particles can be determined.

Examples of the resin particles include: acrylic ester resin particles (polyacrylic ester particles) such as resin particles of acrylic ester, methacrylic ester (polyacrylic ester particles, polymethacrylic ester particles). More specific examples thereof include: resin particles of acrylic ester such as methyl acrylate, ethyl acrylate, and butyl acrylate (polyacrylic ester particles); and resin particles of methacrylic ester such as methyl methacrylate, isopropyl methacrylate, and butyl methacrylate (polymethacrylic ester particles). The amino resin particles are a general term for resins obtained by a condensation reaction of an aldehyde with a compound containing an amino group, and examples thereof include melamine resin particles, benzoguanamine resin particles, urea resins, and aniline aldehyde resins.

Among these resin particles, acrylic ester resin particles are preferably used in considering further stability to an alkylene glycol alkyl ether in ink and suppression of ink leakage. Alternatively, methacrylic ester resin particles are preferably used in considering that the resin particles tend to be stable in ink and ink leakage is easily suppressed and the ink stability over time is easily improved. Furthermore, the alkyl group in the methacrylic ester resin particle structure has a small number of carbon atoms, and thus it tends to be stable in ink. For this reason, the number of carbon atoms of the alkyl group is preferably 1 or more and 6 or less, and more preferably 1 or more and 4 or less. In more considering the effect of suppressing ink leakage, methyl methacrylate resin particles (polymethyl methacrylate particles) is preferably used.

These acrylic ester resin particles (polyacrylic ester particles) may be used alone or in a mixture or a copolymer of two or more. Furthermore, the acrylic ester resin particles (polyacrylic ester particles) need to contain at least acrylic ester resin particles, and may be a mixture of acrylic ester resin particles and another resin, or a copolymer of acrylic ester resin particles and another resin.

As the acrylic ester resin particles (polyacrylic ester particles), acrylic ester resin particles having a crosslinked structure is preferably used in considering suppressing ink leakage and improving ink stability over time. We infer that this is because the acrylic ester resin particles include a crosslinked structure thereby forming a stable particle structure, so that they tend to be stable in ink, and a stable weak aggregated structure between acrylic ester particles is likely to be formed, so that the ink leakage suppression is easily enhanced. The methacrylic ester having a crosslinked structure is preferably used since it tends to be stable in ink, and thus the ink leakage suppression and ink stability over time are easily enhanced.

As the shape of the resin particles, spherical or deformed shaped resin particles can be used, but spherical resin particles are preferable in considering an effect of suppressing ink leakage owing to adhesion between resin particles. The spherical resin particles as used herein are not limited to a true spherical shape, and may be nearly spherical resin particles, nearly elliptical resin particles, or the like.

The resin particles content is preferably 0.01% by mass or more and 10% by mass or less based on the total amount of the ink composition. This is because when the resin particles content is less than 0.01% by mass, the ink leakage is difficult to be suppressed, and when the content is more than 10% by mass, the aggregated structure is prone to be strong, and the ink stability over time, the writing touch, and the writing performance are likely to be affected. Furthermore, in more consideration, the resin particles content based on the total amount of the ink composition is preferably 0.1% by mass or more and 5% by mass or less, particularly preferably 0.3% by mass or more and 3% by mass or less, and most preferably 0.5% by mass or more and 3% by mass or less.

The ink viscosity of the ink composition for ballpoint pens of the present invention is not particularly limited, but in a case where an alkylene glycol alkyl ether or a polyacrylic resin is used, pseudoplasticity is imparted, thereby lowering the ink viscosity while writing and improving the writing touch and writability such as blur. For this reason, the ink viscosity at 20° C. and a shear rate of 100 $\text{sec}^{-1}$ (while writing) is preferably 5000 mPa·s or less. In more considering writing touch and writability (blur), the ink viscosity is preferably 3000 mPa·s or less, and in more considering, the ink viscosity is preferably 2000 mPa·s or less. On the other hand, in considering writability such as weeping and blobbing, blur in handwriting, bleedthrough, and handwriting dryness, the ink viscosity is preferably 100 mPa·s or more, and in more considering, it is preferably 200 mPa·s or more, and it is more preferably 400 mPa·s or more.

Furthermore, in considering ink followability, the ink viscosity at 20° C. and a shear rate of 0.18 $\text{sec}^{-1}$ (in the stationary state) is preferably 50,000 mPa·s or less, and in more consideration, it is preferably 30,000 mPa·s or less. On the other hand, in considering the suppression of ink leakage, the ink viscosity is preferably 1000 mPa·s or more, in more consideration, it is preferably 2000 mPa·s or more, and more preferably 3000 mPa·s or more.

In retractable writing instruments such as knock-type retractable writing instruments and rotary retractable writing instruments, this ink viscosity is effective since it is necessary to more consider the suppression of ink leakage.

As in the present invention, when an alkylene glycol alkyl ether or a polyacrylic resin is used, the viscosity index n refers to n in the viscosity formula indicated by $S=\alpha D^n$. Note that S stands for a shear stress (dyn/cm$^{2=0.1}$ Pa), D stands for a shear rate (s$^{-1}$), and a stands for a viscosity coefficient. The viscosity index n can be calculated by measuring the ink viscosity at 20° C. using a rheometer AR-G2 viscometer (cone plate of 40 mm at an angle of 2°) manufactured by TA Instruments.

With respect to the viscosity index n, it is preferable that the viscosity index n=0.3 or more and 0.8 or less in considering writing touch and writability such as weeping and blobbing, and blurring. In considering a balance of writing touch and writability such as weeping and blobbing, and blurring, it is preferable that the viscosity index n=0.35 or more and 0.7 or less, and is preferably 0.4 or more and 0.7 or less.

(Ballpoint Pen)

Next, a ballpoint pen containing the ink composition for oil-based ballpoint pen of the present invention will be described.

FIG. 1 is a cross-sectional view indicating an example of a ballpoint pen 100 of the present embodiment. The ballpoint pen 100 is an example of an oil-based ballpoint pen.

The ballpoint pen 100 has an ink container 2. The ink container 2 has a tubular shape elongated in an extending direction X. The extending direction X is a direction along a straight line passing through the center of the cut surface of the tubular ink container 2. In other words, the extending direction X is a direction along the central axis of the tubular ink container 2.

An ink composition for oil-based ballpoint pen 10 is accommodated inside the ink container 2. The ink composition for oil-based ballpoint pen 10 is the ink composition for oil-based ballpoint pen of the present invention described above. As described above, in the present embodiment, the ink composition for oil-based ballpoint pen is described by referring to as an ink composition or an ink.

A ballpoint pen tip 4 is provided at one end of the ink container 2 in the extending direction X. The ballpoint pen tip 4 is a member that rotatably holds a ball 3. That is, the ballpoint pen tip 4 holds the ball 3 at a tip end portion which is one end portion of the ink container 2 in the extending direction X.

Figure 2:
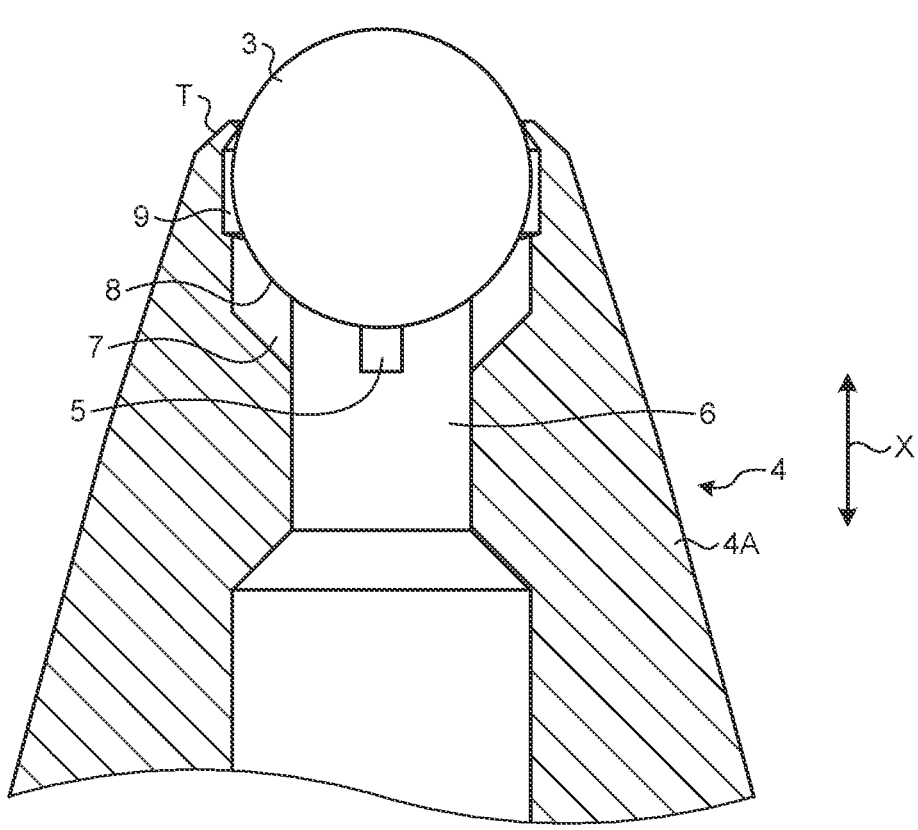
FIG. 2 is an enlarged cross-sectional view indicating an example of a ballpoint pen tip.

FIG. 2 is an enlarged cross-sectional view indicating an example of the ballpoint pen tip 4. The ballpoint pen tip 4 is provided with a tip main body 4A. The tip main body 4A is provided with a coil spring 5, an ink distributing hole 6, an ink distributing channel 7, a ball socket 8, and a ball holding chamber 9.

The ink distributing hole 6 is a hole that penetrates in the extending direction X and through which ink flows. The ink is the ink composition for oil-based ballpoint pen 10. The ink distributing channel 7 is a channel radially extending from the ink distributing hole 6. The ball holding chamber 9 is provided at an end of the ink distributing hole 6, and has the ball socket 8 on which the ball 3 is placed. The ball socket 8 is provided with the coil spring 5, and presses the ball 3 placed on the ball socket 8 toward the inner wall of a tip end T. When the ball 3 is placed on the ball socket 8, the ball 3 is rotatably held in such a way that a part of the ball 3 protrudes from the tip end T.

When writing is carried out with the ballpoint pen 100, an ink as the ink composition for oil-based ballpoint pen 10 flowing out of the ink container 2 is supplied from the ink distributing hole 6 through the ink distributing channel 7 to the ball 3 held in the ball holding chamber 9. The ink is supplied to the ball 3, whereby the writing with the ink is made on a paper surface or the like.

As described above, the ink composition as the ink composition for oil-based ballpoint pen 10 accommodated in the ink container 2 includes a colorant, an alkylene glycol alkyl ether, and a polyacrylic resin.

The ink consumption per writing distance of 100 m of the ballpoint pen 100 including the ink composition containing an alkylene glycol alkyl ether and a polyacrylic resin as the ink composition for oil-based ballpoint pen 10 is preferably more than 20 mg and 100 mg or less. When the ink consumption per 100 m is 20 mg or less, blur in handwriting and point unevenness are likely to occur, and an excellent writing touch is difficult to be achieved. This is because when the ink consumption per writing distance of 100 m is more than 100 mg, the ink leakage is more likely to occur from the gap between the ball 3 and the tip end T, and weeping and blobbing are likely to be generated. In more considering the above-described effect, the ink consumption per writing distance of 100 m of the ballpoint pen 100 is preferably 25 mg or more and 90 mg or less, and more preferably 30 mg or more and 80 mg or less.

Note that with respect to the ink consumption, a spiral writing test is conducted with use of five test samples at a writing speed of 4 m/min under the conditions of a writing angle of 70° and a writing load of 200 g on the writing paper of JIS P3201 at 20° C., and an average value of the ink consumption per writing distance of 100 m from the time point of 0 m to the time point of 100 m at the initial stage of writing is defined as an ink consumption per 100 m.

The diameter of the ball 3 is not limited. For example, the diameter of the ball 3 is in a range of 0.25 mm or more and 1.6 mm or less, preferably 0.5 mm or more and 1.6 mm or less, and more preferably 0.5 mm or more and 1.0 mm or less. Specifically, the diameter of the ball 3 is 0.3 mm, 0.4 mm, 0.5 mm, 0.7 mm, 1.0 mm, 1.2 mm, or 1.6 mm.

Note that, it is effective to consider a relationship between the ink consumption and the diameter of the ball 3 in order to improve writing touch, writability such as blur in handwriting, weeping and blobbing, point unevenness, and dark handwriting, ink leakage suppression, and ink followability.

Specifically, the ratio of the ink consumption (mg) per writing distance of 100 m to the diameter (mm) of ball 3 (ink consumption/diameter of ball 3) is 30 or more. This ratio is chosen to be 30 or more, thereby enabling to improve the writing touch, and having an excellent writability with neither blur nor weeping and blobbing in handwriting.

Alternatively, this ratio is preferably 150 or less. Specifically, this ratio is preferably 40 or more and 140 or less, more preferably 50 or more and 120 or less, and particularly preferably 65 or more and 100 or less, from the viewpoint of easily obtaining more favorable writing touch and writability (suppression of blur, weeping and blobbing), ink followability, and the suppression of ink leakage.

The displacement of the ball 3 of the ballpoint pen tip 4 in the extending direction X is preferably more than 3 μm and 25 μm or less. The displacement of the ball 3 in the extending direction X means a movable distance of the ball 3 in the extending direction X with respect to the tip main body 4A. The displacement may be referred to as a clearance.

When the displacement of the ball 3 in the extending direction X is 3 μm or less, the writability such as blur, weeping and blobbing, and point unevenness in handwriting, and writing touch are likely to be affected. On the other hand, when the displacement is more than 25 μm, weeping and blobbing, ink followability, and the ink leakage suppression are prone to be affected. When the displacement of the ball 3 is within the above-described range, the ratio of the ink consumption (mg) per writing distance 100 m to the diameter (mm) of the ball 3 is easily adjusted to the above-described range of 30 or more and 150 or less.

In more consideration, the displacement of the balls 3 in the extending direction X is preferably more than 3 μm and 22 μm or less. In more consideration, the displacement of the balls 3 in the extending direction X is preferably 5 μm or more and 20 μm or less, and further preferably 7 μm or more and 18 μm or less.

In the present invention, the displacement of the ball 3 of the ballpoint pen tip 4 in the extending direction X represents the displacement of the ball 3 of the ballpoint pen tip 4 in the extending direction X in the initial state prior to the start of writing.

The arithmetic average roughness (Ra) of the surface of the ball 3 of the ballpoint pen tip 4 is preferably 0.1 nm or more and 12 nm or less. This is because when the arithmetic average roughness (Ra) is less than 0.1 nm, the surface of the ball 3 is less likely to be sufficiently coated with the ink, consequently blur, point unevenness, and the like are prone to occur in handwriting. When the arithmetic average roughness (Ra) exceeds 12 nm, the surface of the ball 3 is too rough, and the rotational resistance of the ball 3 and the ball socket 8 increases. For this reason, the writing touch is prone to be poor, and moreover, writability such as blur, weeping and blobbing, and point unevenness in handwriting are likely to be affected. The arithmetic average roughness (Ra) of 0.1 nm or more and 10 nm or less is preferable, since the ink is easily coated on the surface of the ball 3. In more consideration, the arithmetic average roughness (Ra) of the ball 3 is preferably 2 nm or more and 8 nm or less. Note that the arithmetic average roughness (Ra) of the ball 3 can be measured with a surface roughness measuring instrument (model name: SPI3800N manufactured by Seiko Epson Corporation). The arithmetic average roughness (Ra) is an averaged value obtained from the sum of the absolute values of deviations from the mean line to the measured profile in an extracted portion obtained by extracting only a sampling length in the direction of the mean line from the roughness curve measured by the surface roughness measuring device.

The material used for the balls 3 is not particularly limited, and there can be exemplified: cemented carbide balls containing tungsten carbide as a main component; balls made of a metal such as a stainless steel; balls made of ceramics such as silicon carbide, silicon nitride, alumina, silica, and zirconia; and balls made of ruby.

Examples of the material for the ballpoint pen tip 4 include: metal materials such as stainless steel, nickel silver, brass, aluminum bronze, and aluminum; and resin materials such as polycarbonate, polyacetal, and ABS. In considering the wear, the stability over time, and the cost of the ball socket 8, the ballpoint pen tip 4 is preferably provided with a tip main body 4A made of a stainless steel.

When the ink composition for oil-based ballpoint pen 10 of the present invention is used as the ink composition accommodated in the ink container 2, the ink consumption is stabilized from the initial stage of writing to the end of writing. For this reason, an excellent writing touch and writability (suppression of blur, weeping and blobbing) can be stably obtained. Specifically, the ratio of an ink consumption E mg to an ink consumption F mg (E:F) is preferably in the following range. The ink consumption E mg is an ink consumption (mg) from the time point of 0 m to the time point of 100 m at the initial stage of writing. The ink consumption F mg is an ink consumption (mg) from 100 m before the end of ink to the end of ink.

This ratio (E:F) is preferably within the range from 1:0.7 or more to 1:1.3, or less since an excellent writing touch and a good writability (suppression of blur, weeping and blobbing) with less blurring, weeping and blobbing, and point unevenness in handwriting are easily obtained in a stable manner. In more consideration, the ratio (E:F) is preferably within the range from 1:0.8 or more to 1:1.2 or less, and more preferably within the range from 1:0.9 or more to 1:1.1 or less.

EXAMPLES

Hereinafter, the present invention will be specifically described with reference to Examples. However, the present invention is not limited to the following Examples.

Example 1

For an ink composition for oil-based ballpoint pen of Example 1, an alkylene glycol alkyl ether, a colorant, water, a phosphate ester surfactant (HLB value: 10.5), and an organic amine were collected, heated to 60° C., and then dissolved using a disper stirrer to prepare a base ink. Thereafter, while the base ink prepared above being heated, a polyacrylic resin was added thereto and the mixture was sufficiently stirred and mixed until it became a homogeneous state with use of a homogenizer stirrer to give the ink composition for oil-based ballpoint pen of Example 1.

The blending ratio of the organic amine to the polyacrylic resin (organic amine/polyacrylic resin) was 1.5 times.

Specific blending quantities are as follows. Note that with respect to the viscosity of the ink in Example 1 as measured by using a rheometer AR-G2 viscometer (cone plate of 40 mm at an angle of 2°) manufactured by TA Instruments, the ink viscosity=16500 mPa·s at a shear rate of 0.18 sec$^{-1}$ under an environment of 20° C., and the ink viscosity=800 mPa·s at a shear rate of 100 sec$^{-1}$ under an environment of 20° C. The viscosity index n was 0.57.

Example 1 (Ink Formulation)

| | |
|---|---|
| Colorant (dye, a salt-forming dye of a basic dye and an organic acid) | 10.0% by mass |
| Colorant (dye, a salt-forming dye of an acidic dye and an organic amine) | 10.0% by mass |
| Alkylene glycol alkyl ethers (solubility parameter (SP value): 10.5 (cal/cm$^3$)$^{1/2}$, boiling point: 249° C.) | 70.7% by mass |
| Crosslinked polyacrylic resin | 1.3% by mass |
| Water | 5.0% by mass |
| Phosphate ester-based surfactant (HLB value: 10.5) | 1.0% by mass |
| Organic amine (HLB value: 15.4) | 2.0% by mass |

Examples 2 to 43

As shown in Tables 1 to 4, ink compositions for oil-based ballpoint pen 10 of Examples 2 to 43 were obtained in the same procedure as in Example 1 except that the ink components were changed. The measurement and evaluation results are shown in Tables 1 to 4.

Comparative Examples 1 to 6

As shown in Table 4, ink compositions for oil-based ballpoint pen of Comparative Examples 1 to 6 were obtained in the same procedure as in Example 1 except that the ink components were changed. The measurement and evaluation results are shown in Table 4.

TABLE 1

| Examples/Comparative Examples | | | Example 1 | Example 2 | Example 3 | Example 4 |
|---|---|---|---|---|---|---|
| Colorant | (1) | Salt-forming dye of a basic dye and an organic acid | 10.0 | 10.0 | 10.0 | 10.0 |
| | (2) | Salt-forming dye of an acidic dye and an organic amine | 10.0 | 10.0 | 10.0 | 10.0 |
| | (14) | Pigment dispersion (Pigment content 20%, Polyvinyl butyral resin content 20%) | | | | |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 70.7 | 69.1 | 70.5 | 69.0 |

TABLE 1-continued

| | | | | | | |
|---|---|---|---|---|---|---|
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | | |
| Polyacrylic resin | (3) | Crosslinked polyacrylic resin (Carboxyvinyl polymer) | 1.3 | 0.9 | 1.5 | 2.0 |
| | (4) | Crosslinked polyacrylic resin (Carboxyvinyl polymer) | | | | |
| | (5) | Acrylic acid-alkyl methacrylate copolymer | | | | |
| Water | | Water | 5.0 | 5.0 | 5.0 | 5.0 |
| Glycol ether solvent | | Ethylene glycol monophenyl ether (b.p.: 271° C.) | | | | |
| Alcohol solvent | | Benzyl alcohol (b.p.: 205° C.) | | | | |
| Surfactant | (6) | Phosphate ester-based surfactant (HLB: 8.6) | | 2.0 | 1.0 | |
| | (7) | Phosphate ester-based surfactant (HLB: 10.5) | 1.0 | | | 1.0 |
| | (15) | Phosphate ester-based surfactant | | | | |
| | (8) | Fatty acid (Oleic acid) | | | | |
| Organic amine | (9) | Polyoxyethylene alkyl amine (HLB: 15.4) | 2.0 | 3.0 | | 3.0 |
| | (10) | Polyoxyethylene alkyl amine (HLB: 12.5) | | | 2.0 | |
| | (11) | Polyoxyethylene alkyl amine (HLB: 8) | | | | |
| Acrylic ester resin particle | (12) | Crosslinked polymethyl methacrylate particle (Average particle size: 0.8 μm, Number of carbon atoms in alkyl group: 1) | | | | |
| Ketone resin | (16) | Keton resin | | | | |
| Pseudo-plasticity imparting agent | (13) | Fatty acid amide | | | | |
| | | Total | 100.0 | 100.0 | 100.0 | 100.0 |
| | | Blending ratio of alkylene glycol alkyl ethers to polyacrylic resin (Alkylene glycol alkyl ethers/Polyacrylic resin) | 54.4 | 76.8 | 47.0 | 34.5 |
| | | Blending ratio of water to polyacrylic resin (Water/Polyacrylic resin) | 3.8 | 5.6 | 3.3 | 2.5 |
| | | Ink consumption (mg) per writing distance of 100 m | 50 | 53 | 48 | 48 |
| | | Ball diameter (mm) | 0.7 | 0.7 | 0.7 | 0.7 |
| | | A/B, where A (mg) is the ink consumption per writing distance of 100 m, and B (mm) is the ball diameter. | 71 | 76 | 69 | 69 |
| | | Ball displacement (μm) | 8 | 8 | 8 | 8 |
| | | Arithmetic average roughness (Ra) (nm) on the ball surface | 5 | 5 | 5 | 5 |
| Evaluation | | Writing touch | ◎ | ◎ | ◎ | ◎ |
| | | Blur test (Writability test 1) | ◎ | ◎ | ○ | ○ |
| | | Weeping and Blobbing test (Writability test 2) | ◎ | ◎ | ○ | ○ |
| | | Ink leakage test | ○ | ○ | ○ | ○ |

| Examples/Comparative Examples | | | Example 5 | Example 6 | Example 7 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | 10.0 | 10.0 | 10.0 |
| | (14) | Pigment dispersion (Pigment content 20%, Polyvinyl butyral resin content 20%) | | | |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | | | |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | 70.7 | 70.0 | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | 70.7 |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | 1.3 | 2.0 | 1.3 |
| | (4) | Crosslinked polyacrylic resin (Carboxyvinyl polymer) | | | |
| | (5) | Acrylic acid-alkyl methacrylate copolymer | | | |
| Water | | Water | 5.0 | 5.0 | 5.0 |
| Glycol ether solvent | | Ethylene glycol monophenyl ether (b.p.: 271° C.) | | | |
| Alcohol solvent | | Benzyl alcohol (b.p.: 205° C.) | | | |
| Surfactant | (6) | Phosphate ester-based surfactant (HLB: 8.6) | | | |
| | (7) | Phosphate ester-based surfactant (HLB: 10.5) | 1.0 | 1.0 | 1.0 |

TABLE 1-continued

| | | | | | |
|---|---|---|---|---|---|
| Organic amine | (15) | Phosphate ester-based surfactant | | | |
| | (8) | Fatty acid (Oleic acid) | | | |
| | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudo-plasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 54.4 | 35.0 | 54.4 |
| | | Blending ratio of water to polyacrylic resin (Water/Polyacrylic resin) | 3.8 | 2.5 | 3.8 |
| | | Ink consumption (mg) per writing distance of 100 m | 50 | 48 | 50 |
| | | Ball diameter (mm) | 0.7 | 0.7 | 0.7 |
| | | A/B, where A (mg) is the ink consumption per writing distance of 100 m, and B (mm) is the ball diameter. | 71 | 69 | 71 |
| | | Ball displacement (μm) | 8 | 8 | 8 |
| | | Arithmetic average roughness (Ra) (nm) on the ball surface | 5 | 5 | 5 |
| Evaluation | | Writing touch | ◎ | ◎ | ○ |
| | | Blur test (Writability test 1) | ○ | ○ | ○ |
| | | Weeping and Blobbing test (Writability test 2) | ◎ | ◎ | ◎ |
| | | Ink leakage test | ○ | ○ | ○ |

| | | Examples/Comparative Examples | Example 8 | Example 9 | Example 10 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | 10.0 | 10.0 | 10.0 |
| | (14) | Pigment dispersion (Pigment content 20%, Polyvinyl butyral resin content 20%) | | | |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | | 50.7 | 70.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | 20.0 | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | 70.7 | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | 1.3 | 1.3 | |
| | (4) | Crosslinked polyacrylic resin (Carboxyvinyl polymer) | | | 1.3 |
| | (5) | Acrylic acid-alkyl methacrylate copolymer | | | |
| Water | | Water | 5.0 | 5.0 | 5.0 |
| Glycol ether solvent | | Ethylene glycol monophenyl ether (b.p.: 271° C.) | | | |
| Alcohol solvent | | Benzyl alcohol (b.p.: 205° C.) | | | |
| Surfactant | (6) | Phosphate ester-based surfactant (HLB: 8.6) | | | |
| | (7) | Phosphate ester-based surfactant (HLB: 10.5) | 1.0 | 1.0 | 1.0 |
| | (15) | Phosphate ester-based surfactant | | | |
| | (8) | Fatty acid (Oleic acid) | | | |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudo-plasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 54.4 | 54.4 | 54.4 |
| | | Blending ratio of water to polyacrylic resin (Water/Polyacrylic resin) | 3.8 | 3.8 | 3.8 |
| | | Ink consumption (mg) per writing distance of 100 m | 50 | 50 | 50 |
| | | Ball diameter (mm) | 0.7 | 0.7 | 0.7 |
| | | A/B, where A (mg) is the ink consumption per writing distance of 100 m, and B (mm) is the ball diameter. | 71 | 71 | 71 |

23 24

TABLE 1-continued

| Evaluation | | | | | |
|---|---|---|---|---|---|
| | | Ball displacement (μm) | 8 | 8 | 8 |
| | | Arithmetic average roughness (Ra) (nm) on the ball surface | 5 | 5 | 5 |
| | | Writing touch | ○ | ◎ | ○ |
| | | Blur test (Writability test 1) | ○ | ◎ | ◎ |
| | | Weeping and Blobbing test (Writability test 2) | ◎ | ◎ | ◎ |
| | | Ink leakage test | ○ | ○ | ○ |

| Examples/Comparative Examples | | | Example 11 | Example 12 | Example 13 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | 10.0 | 10.0 | 10.0 |
| | (14) | Pigment dispersion (Pigment content 20%, Polyvinyl butyral resin content 20%) | | | |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 70.0 | 70.7 | 73.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | | | 1.3 |
| | (4) | Crosslinked polyacrylic resin (Carboxyvinyl polymer) | 2.0 | | |
| | (5) | Acrylic acid-alkyl methacrylate copolymer | | 1.3 | |
| Water | | Water | 5.0 | 5.0 | 2.0 |
| Glycol ether solvent | | Ethylene glycol monophenyl ether (b.p.: 271° C.) | | | |
| Alcohol solvent | | Benzyl alcohol (b.p.: 205° C.) | | | |
| Surfactant | (6) | Phosphate ester-based surfactant (HLB: 8.6) | | | |
| | (7) | Phosphate ester-based surfactant (HLB: 10.5) | 1.0 | 1.0 | 1.0 |
| | (15) | Phosphate ester-based surfactant | | | |
| | (8) | Fatty acid (Oleic acid) | | | |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudo-plasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 35.0 | 54.4 | 56.7 |
| | | Blending ratio of water to polyacrylic resin (Water/Polyacrylic resin) | 2.5 | 3.8 | 1.5 |
| | | Ink consumption (mg) per writing distance of 100 m | 48 | 50 | 50 |
| | | Ball diameter (mm) | 0.7 | 0.7 | 0.7 |
| | | A/B, where A (mg) is the ink consumption per writing distance of 100 m, and B (mm) is the ball diameter. | 69 | 71 | 71 |
| Evaluation | | Ball displacement (μm) | 8 | 8 | 8 |
| | | Arithmetic average roughness (Ra) (nm) on the ball surface | 5 | 5 | 5 |
| | | Writing touch | ○ | ○ | ◎ |
| | | Blur test (Writability test 1) | ◎ | ○ | ◎ |
| | | Weeping and Blobbing test (Writability test 2) | ◎ | ○ | ◎ |
| | | Ink leakage test | ○ | ○ | ○ |

(1) Manufactured by Orient Chemical Industries Co., Ltd.

(2) Manufactured by Hodogaya Chemical Co., Ltd.

(3) Type 105, manufactured by FUJIFILM Wako Pure Chemical Corporation: Carboxyl group content in polyacrylic resin: 58% by mass to 63% by mass, Bulk specific gravity: 0.14 (g/ml)

(4) Type 104, manufactured by FUJIFILM Wako Pure Chemical Corporation: Carboxyl group content in polyacrylic resin: 58% by mass to 63% by mass, Bulk specific gravity: 0.14 (g/ml)

(5) Carbopol ETD 2020, manufactured by Goodrich Corporation (6) Phosphanol RB-410, manufactured by TOHO Chemical Industry Co., Ltd (HLB: 8.6, Acid value: 85, Number of carbon atoms in alkyl group: 18

(7) Phosphanol RS-610, manufactured by TOHO Chemical Industry Co., Ltd (HLB: 10.5, Acid value: 82, Number of carbon atoms in alkyl group: 13)

(8) Oleic acid, manufactured by Kao Corporation (9) Naimine S-220, manufactured by NOF Corporation (HLB: 15.4, Amine value: 47 to 55, EO Number: 20)

(10) Naimine L-207, manufactured by NOF Corporation (HLB: 12.5, Amine value: 107 to 119, EO Number: 7)

(11) Naimine S-204, manufactured by NOF Corporation (HLB: 8, Amine value: 120 to 134, EO Number: 4)

(16) Manufactured by Hitachi Chemical Company, Ltd.

(12) BMSA-18GN, manufactured by Sekisui Kasei Co., Ltd.

TABLE 1-continued

(13) Manufactured by Kyoeisha Chemical Co., Ltd.

(14) Manufactured by Fuji Pigment Co., Ltd: Pigment content 20%, polyvinyl butyral resin content 20%, Average particle size 150 nm

(15) PLYSURF A208N, manufactured by DKS Co. Ltd. (Acid value: 145, Number of carbon atoms in alkyl group: 12, 13)

(16) Manufactured by Hitachi Chemical Company, Ltd.

TABLE 2

| Examples/Comparative Examples | | | Example 14 | Example 15 | Example 16 | Example 17 |
|---|---|---|---|---|---|---|
| Colorant | (1) | Salt-forming dye of a basic dye and an organic acid | 10.0 | 10.0 | 10.0 | 10.0 |
| | (2) | Salt-forming dye of an acidic dye and an organic amine | 10.0 | 10.0 | 10.0 | 10.0 |
| | (14) | Pigment dispersion (Pigment content 20%, Polyvinyl butyral resin content 20%) | | | | |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 67.7 | 63.7 | 75.7 | 75.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | | |
| Polyacrylic resin | (3) | Crosslinked polyacrylic resin (Carboxyvinyl polymer) | 1.3 | 1.3 | 1.3 | 1.3 |
| | (4) | Crosslinked polyacrylic resin (Carboxyvinyl polymer) | | | | |
| | (5) | Acrylic acid-alkyl methacrylate copolymer | | | | |
| Water | | Water | 8.0 | 12.0 | | |
| Glycol ether solvent | | Ethylene glycol monophenyl ether (b.p.: 271° C.) | | | | |
| Alcohol solvent | | Benzyl alcohol (b.p.: 205° C.) | | | | |
| Surfactant | (6) | Phosphate ester-based surfactant (HLB: 8.6) | | | | |
| | (7) | Phosphate ester-based surfactant (HLB: 10.5) | 1.0 | 1.0 | 1.0 | 1.0 |
| | (15) | Phosphate ester-based surfactant | | | | |
| | (8) | Fatty acid (Oleic acid) | | | | |
| Organic amine | (9) | Polyoxyethylene alkyl amine (HLB: 15.4) | 2.0 | 2.0 | 2.0 | 2.0 |
| | (10) | Polyoxyethylene alkyl amine (HLB: 12.5) | | | | |
| | (11) | Polyoxyethylene alkyl amine (HLB: 8) | | | | |
| Acrylic ester resin particle | (12) | Crosslinked polymethyl methacrylate particle (Average particle size: 0.8 μm, Number of carbon atoms in alkyl group: 1) | | | | |
| Ketone resin | (16) | Keton resin | | | | |
| Pseudoplasticity imparting agent | (13) | Fatty acid amide | | | | |
| | | Total | 100.0 | 100.0 | 100.0 | 100.0 |
| | | Blending ratio of alkylene glycol alkyl ethers to polyacrylic resin (Alkylene glycol alkyl ethers/Polyacrylic resin) | 52.1 | 49.0 | 58.2 | 58.2 |
| | | Blending ratio of water to polyacrylic resin (Water/Polyacrylic resin) | 6.2 | 9.2 | — | — |
| | | Ink consumption (mg) per writing distance of 100 m | 50 | 50 | | 52 |
| | | Ball diameter (mm) | 0.7 | 0.7 | 0.7 | 0.7 |
| | | A/B, where A (mg) is the ink consumption per writing distance of 100 m, and B (mm) is the ball diameter. | 71 | 71 | 74 | 74 |
| | | Ball displacement (μm) | 8 | 8 | 8 | 8 |
| | | Arithmetic average roughness (Ra) (nm) on the ball surface | 5 | 5 | 5 | 5 |
| Evaluation | | Writing touch | ◎ | ◎ | ◎ | ◎ |
| | | Blur test (Writability test 1) | ◎ | ◎ | ○ | ○ |
| | | Weeping and Blobbing test (Writability test 2) | ◎ | ○ | ○ | ○ |
| | | Ink leakage test | ○ | ○ | ○ | ○ |

| Examples/Comparative Examples | | | Example 18 | Example 19 | Example 20 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | 10.0 | 10.0 | 10.0 |
| | (14) | Pigment dispersion (Pigment content 20%, Polyvinyl butyral resin content 20%) | | | |
| Alkylene glycol | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 60.7 | 40.7 | 68.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | |

TABLE 2-continued

| | | | | | |
|---|---|---|---|---|---|
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | 1.3 | 1.3 | 1.3 |
| | (4) | Crosslinked polyacrylic resin (Carboxyvinyl polymer) | | | |
| | (5) | Acrylic acid-alkyl methacrylate copolymer | | | |
| Water | | Water | 5.0 | 5.0 | 5.0 |
| Glycol ether solvent | | Ethylene glycol monophenyl ether (b.p.: 271° C.) | 10.0 | 30.0 | |
| Alcohol solvent | | Benzyl alcohol (b.p.: 205° C.) | | | |
| Surfactant | (6) | Phosphate ester-based surfactant (HLB: 8.6) | | | 2.0 |
| | (7) | Phosphate ester-based surfactant (HLB: 10.5) | 1.0 | 1.0 | |
| | (15) | Phosphate ester-based surfactant | | | |
| | (8) | Fatty acid (Oleic acid) | | | 1.0 |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudoplasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 46.7 | 31.3 | 52.8 |
| | | Blending ratio of water to polyacrylic resin (Water/Polyacrylic resin) | 3.8 | 3.8 | 3.8 |
| | | Ink consumption (mg) per writing distance of 100 m | 50 | 50 | 50 |
| | | Ball diameter (mm) | 0.7 | 0.7 | 0.7 |
| | | A/B, where A (mg) is the ink consumption per writing distance of 100 m, and B (mm) is the ball diameter. | 71 | 71 | 71 |
| | | Ball displacement (μm) | 8 | 8 | 8 |
| | | Arithmetic average roughness (Ra) (nm) on the ball surface | 5 | 5 | 5 |
| Evaluation | | Writing touch | ◎ | ◎ | ◎ |
| | | Blur test (Writability test 1) | ◎ | ◎ | ◎ |
| | | Weeping and Blobbing test (Writability test 2) | ○ | Δ | ◎ |
| | | Ink leakage test | ○ | ○ | ○ |

| | | Examples/Comparative Examples | Example 21 | Example 22 | Example 23 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | 10.0 | 10.0 | 10.0 |
| | (14) | Pigment dispersion (Pigment content 20%, Polyvinyl butyral resin content 20%) | | | |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 69.7 | 71.5 | 71.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | 1.3 | 1.5 | 1.3 |
| | (4) | Crosslinked polyacrylic resin (Carboxyvinyl polymer) | | | |
| | (5) | Acrylic acid-alkyl methacrylate copolymer | | | |
| Water | | Water | 5.0 | 5.0 | 5.0 |
| Glycol ether solvent | | Ethylene glycol monophenyl ether (b.p.: 271° C.) | | | |
| Alcohol solvent | | Benzyl alcohol (b.p.: 205° C.) | | | |
| Surfactant | (6) | Phosphate ester-based surfactant (HLB: 8.6) | | | |
| | (7) | Phosphate ester-based surfactant (HLB: 10.5) | 2.0 | | 1.0 |
| | (15) | Phosphate ester-based surfactant | | | |
| | (8) | Fatty acid (Oleic acid) | | | |

TABLE 2-continued

| | | | | | |
|---|---|---|---|---|---|
| Organic amine | (9) | Polyoxyethylene alkyl amine (HLB: 15.4) | 2.0 | 2.0 | |
| | (10) | Polyoxyethylene alkyl amine (HLB: 12.5) | | | |
| | (11) | Polyoxyethylene alkyl amine (HLB: 8) | | | 1.0 |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudoplasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 53.6 | 47.7 | 55.2 |
| | | Blending ratio of water to polyacrylic resin (Water/Polyacrylic resin) | 3.8 | 3.3 | 3.8 |
| | | Ink consumption (mg) per writing distance of 100 m | 50 | 50 | 50 |
| | | Ball diameter (mm) | 0.7 | 0.7 | 0.7 |
| | | A/B, where A (mg) is the ink consumption per writing distance of 100 m, and B (mm) is the ball diameter. | 71 | 71 | 71 |
| | | Ball displacement (μm) | 8 | 8 | 8 |
| | | Arithmetic average roughness (Ra) (nm) on the ball surface | 5 | 5 | 5 |
| Evaluation | | Writing touch | ◎ | ○ | ◎ |
| | | Blur test (Writability test 1) | ◎ | ○ | ◎ |
| | | Weeping and Blobbing test (Writability test 2) | ◎ | ○ | ◎ |
| | | Ink leakage test | ○ | Δ | ○ |

| Examples/Comparative Examples | | | Example 24 | Example 25 | Example 26 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | 10.0 | 10.0 | 10.0 |
| | (14) | Pigment dispersion (Pigment content 20%, Polyvinyl butyral resin content 20%) | | | |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | | 69.7 | 68.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | 70.7 | | |
| Polyacrylic resin | (3) | Crosslinked polyacrylic resin (Carboxyvinyl polymer) | 1.3 | 1.3 | 1.3 |
| | (4) | Crosslinked polyacrylic resin (Carboxyvinyl polymer) | | | |
| | (5) | Acrylic acid-alkyl methacrylate copolymer | | | |
| Water | | Water | 5.0 | 5.0 | 5.0 |
| Glycol ether solvent | | Ethylene glycol monophenyl ether (b.p.: 271° C.) | | | |
| Alcohol solvent | | Benzyl alcohol (b.p.: 205° C.) | | | |
| Surfactant | (6) | Phosphate ester-based surfactant (HLB: 8.6) | | | |
| | (7) | Phosphate ester-based surfactant (HLB: 10.5) | 1.0 | 1.0 | 1.0 |
| | (15) | Phosphate ester-based surfactant | | | |
| | (8) | Fatty acid (Oleic acid) | | | |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | 1.0 | 2.0 |
| Ketone resin | (16) | Keton resin | | | |
| Pseudoplasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 54.4 | 53.6 | 52.8 |
| | | Blending ratio of water to polyacrylic resin (Water/Polyacrylic resin) | 3.8 | 3.8 | 3.8 |
| | | Ink consumption (mg) per writing distance of 100 m | 50 | 48 | 48 |
| | | Ball diameter (mm) | 0.7 | 0.7 | 0.7 |
| | | A/B, where A (mg) is the ink consumption per writing distance of 100 m, and B (mm) is the ball diameter. | 71 | 69 | 69 |
| | | Ball displacement (μm) | 8 | 8 | 8 |
| | | Arithmetic average roughness (Ra) (nm) on the ball surface | 5 | 5 | 5 |

TABLE 2-continued

| Evaluation | | | |
|---|---|---|---|
| Writing touch | ○ | ◉ | ◉ |
| Blur test (Writability test 1) | ○ | ◉ | ◉ |
| Weeping and Blobbing test (Writability test 2) | ○ | ◉ | ◉ |
| Ink leakage test | ○ | ◉ | ◉ |

(1) Manufactured by Orient Chemical Industries Co., Ltd.

(2) Manufactured by Hodogaya Chemical Co., Ltd.

(3) Type 105, manufactured by FUJIFILM Wako Pure Chemical Corporation: Carboxyl group content in polyacrylic resin: 58% by mass to 63% by mass, Bulk specific gravity: 0.14 (g/ml)

(4) Type 104, manufactured by FUJIFILM Wako Pure Chemical Corporation: Carboxyl group content in polyacrylic resin: 58% by mass to 63% by mass, Bulk specific gravity: 0.14 (g/ml)

(5) Carbopol ETD 2020, manufactured by Goodrich Corporation (6) Phosphanol RB-410, manufactured by TOHO Chemical Industry Co., Ltd (HLB: 8.6, Acid value: 85, Number of carbon atoms in alkyl group: 18)

(7) Phosphanol RS-610, manufactured by TOHO Chemical Industry Co., Ltd (HLB: 10.5, Acid value: 82, Number of carbon atoms in alkyl group: 13)

(8) Oleic acid, manufactured by Kao Corporation (9) Naimine S-220, manufactured by NOF Corporation (HLB: 15.4, Amine value: 47 to 55, EO Number: 20)

(10) Naimine L-207, manufactured by NOF Corporation (HLB: 12.5, Amine value: 107 to 119, EO Number: 7)

(11) Naimine S-204, manufactured by NOF Corporation (HLB: 8, Amine value: 120 to 134, EO Number: 4)

(16) Manufactured by Hitachi Chemical Company, Ltd.

(12) BMSA-18GN, manufactured by Sekisui Kasei Co., Ltd.

(13) Manufactured by Kyoeisha Chemical Co., Ltd.

(14) Manufactured by Fuji Pigment Co., Ltd: Pigment content 20%, polyvinyl butyral resin content 20%, Average particle size 150 nm

(15) PLYSURF A208N, manufactured by DKS Co. Ltd. (Acid value: 145, Number of carbon atoms in alkyl group: 12, 13)

(16) Manufactured by Hitachi Chemical Company, Ltd.

TABLE 3

| Examples/Comparative Examples | | | Example 27 | Example 28 | Example 29 | Example 30 |
|---|---|---|---|---|---|---|
| Colorant | (1) | Salt-forming dye of a basic dye and an organic acid | 10.0 | 10.0 | 10.0 | 10.0 |
| | (2) | Salt-forming dye of an acidic dye and an organic amine | 10.0 | 10.0 | 10.0 | |
| | (14) | Pigment dispersion (Pigment content 20%, Polyvinyl butyral resin content 20%) | | | | 10.0 |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | | 65.7 | 70.7 | 70.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | 69.7 | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | | |
| Polyacrylic resin | (3) | Crosslinked polyacrylic resin (Carboxyvinyl polymer) | 1.3 | 1.3 | 1.3 | 1.3 |
| | (4) | Crosslinked polyacrylic resin (Carboxyvinyl polymer) | | | | |
| | (5) | Acrylic acid-alkyl methacrylate copolymer | | | | |
| Water | | Water | 5.0 | 5.0 | 5.0 | 5.0 |
| Glycol ether solvent | | Ethylene glycol monophenyl ether (b.p.: 271° C.) | | | | |
| Alcohol solvent | | Benzyl alcohol (b.p.: 205° C.) | | | | |
| Surfactant | (6) | Phosphate ester-based surfactant (HLB: 8.6) | | | | |
| | (7) | Phosphate ester-based surfactant (HLB: 10.5) | 1.0 | 1.0 | | 1.0 |
| | (15) | Phosphate ester-based surfactant | | | 1.0 | |
| | (8) | Fatty acid (Oleic acid) | | | | |
| Organic amine | (9) | Polyoxyethylene alkyl amine (HLB: 15.4) | 2.0 | 2.0 | 2.0 | 2.0 |
| | (10) | Polyoxyethylene alkyl amine (HLB: 12.5) | | | | |
| | (11) | Polyoxyethylene alkyl amine (HLB: 8) | | | | |
| Acrylic ester resin particle | (12) | Crosslinked polymethyl methacrylate particle (Average particle size: 0.8 μm, Number of carbon atoms in alkyl group: 1) | 1.0 | | | |
| Ketone resin | (16) | Keton resin | | 5.0 | | |
| Pseudoplasticity imparting agent | (13) | Fatty acid amide | | | | |
| | | Total | 100.0 | 100.0 | 100.0 | 100.0 |
| | | Blending ratio of alkylene glycol alkyl ethers to polyacrylic resin (Alkylene glycol alkyl ethers/Polyacrylic resin) | 53.6 | 50.5 | 54.4 | 54.4 |
| | | Blending ratio of water to polyacrylic resin (Water/Polyacrylic resin) | 3.8 | 3.8 | 3.8 | 3.8 |
| | | Ink consumption (mg) per writing distance of 100 m | 48 | 48 | 48 | 50 |
| | | Ball diameter (mm) | 0.7 | 0.7 | 0.7 | 0.7 |
| | | A/B, where A (mg) is the ink consumption per writing distance of 100 m, and B (mm) is the ball diameter. | 69 | 69 | 69 | 71 |

TABLE 3-continued

| | | | | | | |
|---|---|---|---|---|---|---|
| Evaluation | Ball displacement (μm) | | 8 | 8 | 8 | 8 |
| | Arithmetic average roughness (Ra) (nm) on the ball surface | | 5 | 5 | 5 | 5 |
| | Writing touch | | ◎ | ◎ | ◎ | ◎ |
| | Blur test (Writability test 1) | | ○ | ◎ | ◎ | ◎ |
| | Weeping and Blobbing test (Writability test 2) | | ◎ | ◎ | ◎ | ◎ |
| | Ink leakage test | | ◎ | ◎ | ○ | ○ |

| | | Examples/Comparative Examples | Example 31 | Example 32 | Example 33 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | | | |
| | (14) | Pigment dispersion (Pigment content 20%, Polyvinyl butyral resin content 20%) | 10.0 | 10.0 | 10.0 |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 71.1 | | 66.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | 70.7 | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | 0.9 | 1.3 | 1.3 |
| | (4) | Crosslinked polyacrylic resin (Carboxyvinyl polymer) | | | |
| | (5) | Acrylic acid-alkyl methacrylate copolymer | | | |
| Water | | Water | 5.0 | 5.0 | 8.0 |
| Glycol ether solvent | | Ethylene glycol monophenyl ether (b.p.: 271° C.) | | | |
| Alcohol solvent | | Benzyl alcohol (b.p.: 205° C.) | | | |
| Surfactant | (6) | Phosphate ester-based surfactant (HLB: 8.6) | | | |
| | (7) | Phosphate ester-based surfactant (HLB: 10.5) | 1.0 | 1.0 | |
| | (15) | Phosphate ester-based surfactant | | | 2.0 |
| | (8) | Fatty acid (Oleic acid) | | | |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudoplasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 79.0 | 54.4 | 51.3 |
| | | Blending ratio of water to polyacrylic resin (Water/Polyacrylic resin) | 5.6 | 3.8 | 6.2 |
| | | Ink consumption (mg) per writing distance of 100 m | 52 | 50 | 50 |
| | | Ball diameter (mm) | 0.7 | 0.7 | 0.7 |
| | | A/B, where A (mg) is the ink consumption per writing distance of 100 m, and B (mm) is the ball diameter. | 74 | 71 | 71 |
| Evaluation | | Ball displacement (μm) | 8 | 8 | 8 |
| | | Arithmetic average roughness (Ra) (nm) on the ball surface | 7 | 5 | 5 |
| | | Writing touch | ◎ | ◎ | ◎ |
| | | Blur test (Writability test 1) | ◎ | ◎ | ◎ |
| | | Weeping and Blobbing test (Writability test 2) | ◎ | ◎ | ◎ |
| | | Ink leakage test | ○ | ○ | ○ |

| | | Examples/Comparative Examples | Example 34 | Example 35 | Example 36 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | | | |
| | (14) | Pigment dispersion (Pigment content 20%, Polyvinyl butyral resin content 20%) | 10.0 | 10.0 | 10.0 |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 63.3 | 58.3 | 70.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | |
| | | Diethylene glycol monobutyl ether (SP value: 9.5, b.p.: 230° C.) (Number of carbon atoms in the alkylene glycol moiety: 4, | | | |

TABLE 3-continued

| | | | | | |
|---|---|---|---|---|---|
| | | Number of carbon atoms in the alkyl ether moiety: 4) | | | |
| | | Triethylene glycol monobutyl ether (SP value: 9.6, b.p.: 271° C.) | | | |
| | | (Number of carbon atoms in the alkylene glycol moiety: 6, | | | |
| | | Number of carbon atoms in the alkyl ether moiety: 4) | | | |
| | | Including butylene glycol-monomethyl ether structure (SP value: 9.8, b.p.: 174° C.) | | | |
| | | (Number of carbon atoms in the alkylene glycol moiety: 4, | | | |
| | | Number of carbon atoms in the alkyl ether moiety: 1) | | | |
| Polyacrylic resin | (3) | Crosslinked polyacrylic resin (Carboxyvinyl polymer) | 0.7 | 0.7 | 1.3 |
| | (4) | Crosslinked polyacrylic resin (Carboxyvinyl polymer) | | | |
| | (5) | Acrylic acid-alkyl methacrylate copolymer | | | |
| Water | | Water | 8.0 | 8.0 | 5.0 |
| Glycol ether solvent | | Ethylene glycol monophenyl ether (b.p.: 271° C.) | | | |
| Alcohol solvent | | Benzyl alcohol (b.p.: 205° C.) | | | |
| Surfactant | (6) | Phosphate ester-based surfactant (HLB: 8.6) | | | |
| | (7) | Phosphate ester-based surfactant (HLB: 10.5) | 1.0 | 1.0 | 1.0 |
| | (15) | Phosphate ester-based surfactant | | | |
| | (8) | Fatty acid (Oleic acid) | | | |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | 5.0 | 10.0 | |
| Pseudoplasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 90.4 | 83.3 | 54.4 |
| | | Blending ratio of water to polyacrylic resin (Water/Polyacrylic resin) | 11.4 | 11.4 | 3.8 |
| | | Ink consumption (mg) per writing distance of 100 m | 50 | 50 | 63 |
| | | Ball diameter (mm) | 0.7 | 0.7 | 0.7 |
| | | A/B, where A (mg) is the ink consumption per writing distance of 100 m, and B (mm) is the ball diameter. | 71 | 71 | 90 |
| | | Ball displacement (μm) | 8 | 8 | 12 |
| | | Arithmetic average roughness (Ra) (nm) on the ball surface | 5 | 2 | 5 |
| Evaluation | | Writing touch | ◎ | ◎ | ◎ |
| | | Blur test (Writability test 1) | ◎ | ◎ | ◎ |
| | | Weeping and Blobbing test (Writability test 2) | ◎ | ◎ | ◎ |
| | | Ink leakage test | ◎ | ◎ | ○ |

| | | Examples/Comparative Examples | Example 37 | Example 38 | Example 39 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | | | |
| | (14) | Pigment dispersion (Pigment content 20%, Polyvinyl butyral resin content 20%) | 10.0 | 10.0 | 10.0 |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 70.7 | 70.7 | 70.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | 1.3 | 1.3 | 1.3 |
| | (4) | Crosslinked polyacrylic resin (Carboxyvinyl polymer) | | | |
| | (5) | Acrylic acid-alkyl methacrylate copolymer | | | |
| Water | | Water | 5.0 | 5.0 | 5.0 |
| Glycol ether solvent | | Ethylene glycol monophenyl ether (b.p.: 271° C.) | | | |
| Alcohol solvent | | Benzyl alcohol (b.p.: 205° C.) | | | |
| Surfactant | (6) | Phosphate ester-based surfactant (HLB: 8.6) | | | |
| | (7) | Phosphate ester-based surfactant (HLB: 10.5) | 1.0 | 1.0 | 1.0 |
| | (15) | Phosphate ester-based surfactant | | | |
| | (8) | Fatty acid (Oleic acid) | | | |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |

TABLE 3-continued

| | | | | | |
|---|---|---|---|---|---|
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudoplasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | 54.4 | 54.4 | 54.4 |
| | | Blending ratio of water to polyacrylic resin (Water/Polyacrylic resin) | 3.8 | 3.8 | 3.8 |
| | | Ink consumption (mg) per writing distance of 100 m | 70 | 90 | 100 |
| | | Ball diameter (mm) | 0.7 | 0.7 | 0.7 |
| | | A/B, where A (mg) is the ink consumption per writing distance of 100 m, and B (mm) is the ball diameter. | 100 | 129 | 143 |
| | | Ball displacement (μm) | 14 | 16 | 22 |
| | | Arithmetic average roughness (Ra) (nm) on the ball surface | 5 | 5 | 5 |
| Evaluation | | Writing touch | ◎ | ◎ | ◎ |
| | | Blur test (Writability test 1) | ◎ | ◎ | ◎ |
| | | Weeping and Blobbing test (Writability test 2) | ◎ | ○ | Δ |
| | | Ink leakage test | ○ | ○ | Δ |

(1) Manufactured by Orient Chemical Industries Co., Ltd.

(2) Manufactured by Hodogaya Chemical Co., Ltd.

(3) Type 105, manufactured by FUJIFILM Wako Pure Chemical Corporation: Carboxyl group content in polyacrylic resin: 58% by mass to 63% by mass, Bulk specific gravity: 0.14 (g/ml)

(4) Type 104, manufactured by FUJIFILM Wako Pure Chemical Corporation: Carboxyl group content in polyacrylic resin: 58% by mass to 63% by mass, Bulk specific gravity: 0.14 (g/ml)

(5) Carbopol ETD 2020, manufactured by Goodrich Corporation (6) Phosphanol RB-410, manufactured by TOHO Chemical Industry Co., Ltd (HLB: 8.6, Acid value: 85, Number of carbon atoms in alkyl group: 18)

(7) Phosphanol RS-610, manufactured by TOHO Chemical Industry Co., Ltd (HLB: 10.5, Acid value: 82, Number of carbon atoms in alkyl group: 13)

(8) Oleic acid, manufactured by Kao Corporation (9) Naimine S-220, manufactured by NOF Corporation (HLB: 15.4, Amine value: 47 to 55, EO Number: 20)

(10) Naimine L-207, manufactured by NOF Corporation (HLB: 12.5, Amine value: 107 to 119, EO Number: 7)

(11) Naimine S-204, manufactured by NOF Corporation (HLB: 8, Amine value: 120 to 134, EO Number: 4)

(16) Manufactured by Hitachi Chemical Company, Ltd.

(12) BMSA-18GN (Manufactured by Sekisui Kasei Co., Ltd.)

(13) Manufactured by Kyoeisha Chemical Co., Ltd.

(14) Manufactured by Fuji Pigment Co., Ltd: Pigment content 20%, polyvinyl butyral resin content 20%, Average particle size 150 nm

(15) PLYSURF A208N, manufactured by DKS Co. Ltd. (Acid value: 145, Number of carbon atoms in alkyl group: 12, 13)

(16) Manufactured by Hitachi Chemical Company, Ltd.

TABLE 4

| | | Examples/Comparative Examples | Example 40 | Example 41 | Example 42 | Example 43 |
|---|---|---|---|---|---|---|
| Colorant | (1) | Salt-forming dye of a basic dye and an organic acid | 10.0 | 10.0 | 10.0 | 10.0 |
| | (2) | Salt-forming dye of an acidic dye and an organic amine | | | | |
| | (14) | Pigment dispersion (Pigment content 20%, Polyvinyl butyra resin content 20%) | 10.0 | 10.0 | 10.0 | 10.0 |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | 70.7 | 70.7 | 70.7 | 70.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | | |
| Polyacrylic resin | (3) | Crosslinked polyacrylic resin (Carboxyvinyl polymer) | 1.3 | 1.3 | 1.3 | 1.3 |
| | (4) | Crosslinked polyacrylic resin (Carboxyvinyl polymer) | | | | |
| | (5) | Acrylic acid-alkyl methacrylate copolymer | | | | |
| Water | | Water | 5.0 | 5.0 | 5.0 | 5.0 |
| Glycol ether solvent | | Ethylene glycol monophenyl ether (b.p.: 271° C.) | | | | |
| Alcohol solvent | | Benzyl alcohol (b.p.: 205° C.) | | | | |
| Surfactant | (6) | Phosphate ester-based surfactant (HLB: 8.6) | | | | |
| | (7) | Phosphate ester-based surfactant (HLB: 10.5) | 1.0 | 1.0 | 1.0 | 1.0 |
| | (15) | Phosphate ester-based surfactant | | | | |
| | (8) | Fatty acid (Oleic acid) | | | | |

TABLE 4-continued

| | | | | | | |
|---|---|---|---|---|---|---|
| Organic amine | (9) | Polyoxyethylene alkyl amine (HLB: 15.4) | 2.0 | 2.0 | 2.0 | 2.0 |
| | (10) | Polyoxyethylene alkyl amine (HLB: 12.5) | | | | |
| | (11) | Polyoxyethylene alkyl amine (HLB: 8) | | | | |
| Acrylic ester resin particle | (12) | Crosslinked polymethyl methacrylate particle (Average particle size: 0.8 μm, Number of carbon atoms in alkyl group: 1) | | | | |
| Ketone resin | (16) | Keton resin | | | | |
| Pseudoplasticity imparting agent | (13) | Fatty acid amide | | | | |
| | | Total | 100.0 | 100.0 | 100.0 | 100.0 |
| | | Blending ratio of alkylene glycol alkyl ethers to polyacrylic resin (Alkylene glycol alkyl ethers/Polyacrylic resin) | 54.4 | 54.4 | 54.4 | 54.4 |
| | | Blending ratio of water to polyacrylic resin (Water/Polyacrylic resin) | 3.8 | 3.8 | 3.8 | 3.8 |
| | | Ink consumption (mg) per writing distance of 100 m | 45 | 45 | 70 | 38 |
| | | Ball diameter (mm) | 0.7 | 0.5 | 1.0 | 0.7 |
| | | A/B, where A (mg) is the ink consumption per writing distance of 100 m, and B (mm) is the ball diameter. | 64 | 90 | 70 | 54 |
| | | Ball displacement (μm) | 6 | 5 | 14 | 4 |
| | | Arithmetic average roughness (Ra) (nm) on the ball surface | 5 | 5 | 5 | 5 |
| Evaluation | | Writing touch | ◎ | ◎ | ◎ | ○ |
| | | Blur test (Writability test 1) | ○ | ◎ | ◎ | Δ |
| | | Weeping and Blobbing test (Writability test 2) | ◎ | ◎ | ◎ | ◎ |
| | | Ink leakage test | ○ | ○ | ○ | ◎ |

| | | Examples/Comparative Examples | Comparative Example 1 | Comparative Example 2 | Comparative Example 3 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | 10.0 | 10.0 | 10.0 |
| | (14) | Pigment dispersion (Pigment content 20%, Polyvinyl butyra resin content 20%) | | | |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | | 72.0 | 70.0 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | 1.3 | | |
| | (4) | Crosslinked polyacrylic resin (Carboxyvinyl polymer) | | | |
| | (5) | Acrylic acid-alkyl methacrylate copolymer | | | |
| Water | | Water | 5.0 | 5.0 | 5.0 |
| Glycol ether solvent | | Ethylene glycol monophenyl ether (b.p.: 271° C.) | | | |
| Alcohol solvent | | Benzyl alcohol (b.p.: 205° C.) | 70.7 | | |
| Surfactant | (6) | Phosphate ester-based surfactant (HLB: 8.6) | | | |
| | (7) | Phosphate ester-based surfactant (HLB: 10.5) | 1.0 | 1.0 | 1.0 |
| | (15) | Phosphate ester-based surfactant | | | |
| | (8) | Fatty acid (Oleic acid) | | | |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudoplasticity imparting agent | (13) | Fatty acid amide | | | 2.0 |
| | | Total | 100.0 | 100.0 | 100.0 |
| | | Blending ratio of alkylene glycol alkyl ethers to polyacrylic resin (Alkylene glycol alkyl ethers/Polyacrylic resin) | — | — | — |
| | | Blending ratio of water to polyacrylic resin (Water/Polyacrylic resin) | — | — | — |
| | | Ink consumption (mg) per writing distance of 100 m | 50 | 60 | 45 |
| | | Ball diameter (mm) | 0.7 | 0.7 | 0.7 |
| | | A/B, where A (mg) is the ink consumption per writing distance of 100 m, and B (mm) is the ball diameter. | 71 | 86 | 64 |
| | | Ball displacement (μm) | 8 | 8 | 8 |
| | | Arithmetic average roughness (Ra) (nm) on the ball surface | 5 | 5 | 5 |

TABLE 4-continued

| Evaluation | | | | | |
|---|---|---|---|---|---|
| Writing touch | | | Δ | Δ | Δ |
| Blur test (Writability test 1) | | | ○ | Δ | Δ |
| Weeping and Blobbing test (Writability test 2) | | | Δ | Δ | Δ |
| Ink leakage test | | | X | X | Δ |

| Examples/Comparative Examples | | | Comparative Example 4 | Comparative Example 5 | Comparative Example 6 |
|---|---|---|---|---|---|
| Colorant | (1) | Salt-forming dye of a basic dye and an organic acid | 10.0 | 10.0 | 10.0 |
| | (2) | Salt-forming dye of an acidic dye and an organic amine | | | |
| | (14) | Pigment dispersion (Pigment content 20%, Polyvinyl butyra resin content 20%) | 100 | 10.0 | 10.0 |
| Alkylene glycol alkyl ethers | | Triethylene glycol monomethyl ether (SP value: 10.5, b.p.: 249° C.) (Number of carbon atoms in the alkylene glycol moiety: 6, Number of carbon atoms in the alkyl ether moiety: 1) | | 72.0 | 70.7 |
| | | Propylene glycol monomethyl ether (SP value: 10.4, b.p.: 121° C.) (Number of carbon atoms in the alkylene glycol moiety: 3, Number of carbon atoms in the alkyl ether moiety: 1) | | | |
| | | Diethylene glycol monobutyl ether (SP value: 9.5, b.p.: 230° C.) (Number of carbon atoms in the alkylene glycol moiety: 4, Number of carbon atoms in the alkyl ether moiety: 4) | | | |
| | | Triethylene glycol monobutyl ether (SP value: 9.6, b.p.: 271° C.) (Number of carbon atoms in the alkylene glycol moiety: 6, Number of carbon atoms in the alkyl ether moiety: 4) | | | |
| | | Including butylene glycol-monomethyl ether structure (SP value: 9.8, b.p.: 174° C.) (Number of carbon atoms in the alkylene glycol moiety: 4, Number of carbon atoms in the alkyl ether moiety: 1) | | | |
| Polyacrylic resin | (3) | Crosslinked polyacrylic resin (Carboxyvinyl polymer) | 1.3 | | 1.3 |
| | (4) | Crosslinked polyacrylic resin (Carboxyvinyl polymer) | | | |
| | (5) | Acrylic acid-alkyl methacrylate copolymer | | | |
| Water | | Water | 5.0 | 5.0 | 5.0 |
| Glycol ether solvent | | Ethylene glycol monophenyl ether (b.p.: 271° C.) | | | |
| Alcohol solvent | | Benzyl alcohol (b.p.: 205° C.) | 70.7 | | |
| Surfactant | (6) | Phosphate ester-based surfactant (HLB: 8.6) | | | |
| | (7) | Phosphate ester-based surfactant (HLB: 10.5) | 1.0 | 1.0 | 1.0 |
| | (15) | Phosphate ester-based surfactant | | | |
| | (8) | Fatty acid (Oleic acid) | | | |
| Organic amine | (9) | Polyoxyethylene alkyl amine (HLB: 15.4) | 2.0 | 2.0 | 2.0 |
| | (10) | Polyoxyethylene alkyl amine (HLB: 12.5) | | | |
| | (11) | Polyoxyethylene alkyl amine (HLB: 8) | | | |
| Acrylic ester resin particle | (12) | Crosslinked polymethyl methacrylate particle (Average particle size: 0.8 μm, Number of carbon atoms in alkyl group: 1) | | | |
| Ketone resin | (16) | Keton resin | | | |
| Pseudoplasticity imparting agent | (13) | Fatty acid amide | | | |
| | | Total | 100.0 | 100.0 | 100.0 |
| | | Blending ratio of alkylene glycol alkyl ethers to polyacrylic resin (Alkylene glycol alkyl ethers/Polyacrylic resin) | — | — | 54.4 |
| | | Blending ratio of water to polyacrylic resin (Water/Polyacrylic resin) | — | — | 3.8 |
| | | Ink consumption (mg) per writing distance of 100 m | 50 | 60 | 20 |
| | | Ball diameter (mm) | 0.7 | 0.7 | 0.7 |
| | | A/B, where A (mg) is the ink consumption per writing distance of 100 m, and B (mm) is the ball diameter. | 71 | 86 | 29 |
| | | Ball displacement (μm) | 8 | 8 | 3 |
| | | Arithmetic average roughness (Ra) (nm) on the ball surface | 5 | 5 | 5 |
| Evaluation | | Writing touch | Δ | Δ | Δ |
| | | Blur test (Writability test 1) | ○ | Δ | XX |
| | | Weeping and Blobbing test (Writability test 2) | Δ | Δ | ◎ |
| | | Ink leakage test | X | X | ◎ |

(1) Manufactured by Orient Chemical Industries Co., Ltd.
(2) Manufactured by Hodogaya Chemical Co., Ltd.
(3) Type 105, manufactured by FUJIFILM Wako Pure Chemical Corporation: Carboxyl group content in polyacrylic resin: 58% by mass to 63% by mass, Bulk specific gravity: 0.14 (g/ml)
(4) Type 104, manufactured by FUJIFILM Wako Pure Chemical Corporation: Carboxyl group content in polyacrylic resin: 58% by mass to 63% by mass, Bulk specific gravity: 0.14 (g/ml)
(5) Carbopol ETD 2020, manufactured by Goodrich Corporation
(6) Phosphanol RB-410, manufactured by TOHO Chemical Industry Co., Ltd (HLB: 8.6, Acid value: 85, Number of carbon atoms in alkyl group: 18)
(7) Phosphanol RS-610, manufactured by TOHO Chemical Industry Co., Ltd (HLB: 10.5, Acid value: 82, Number of carbon atoms in alkyl group: 13)
(8) Oleic acid, manufactured by Kao Corporation
(9) Naimine S-220, manufactured by NOF Corporation (HLB: 15.4, Amine value: 47 to 55, EO Number: 20)
(10) Naimine L-207, manufactured by NOF Corporation (HLB: 12.5, Amine value: 107 to 119, EO Number: 7)
(11) Naimine S-204, manufactured by NOF Corporation (HLB: 8, Amine value: 120 to 134, EO Number: 4)
(16) Manufactured by Hitachi Chemical Company, Ltd.
(12) BMSA-18GN, manufactured by Sekisui Kasei Co., Ltd.

TABLE 4-continued

(13) Manufactured by Kyoeisha Chemical Co., Ltd.
(14) Manufactured by Fuji Pigment Co., Ltd: Pigment content 20%, polyvinyl butyral resin content 20%, Average particle size 150 nm
(15) PLYSURF A208N, manufactured by DKS Co. Ltd. (Acid value: 145, Number of carbon atoms in alkyl group: 12, 13)
(16) Manufactured by Hitachi Chemical Company, Ltd.

Test and Evaluation

Tests and evaluations were conducted using the ballpoint pen 100 described with reference to FIGS. 1 and 2. Specifically, the ink compositions for oil-based ballpoint pen (0.29 g) produced in Examples 1 to 43 and Comparative Examples 1 to 6 were accommodated in each ink container 2 (made of polypropylene). Then, the ballpoint pen tip 4 rotatably holding the ball 3 was attached to one end of the ink container 2 to prepare a ballpoint pen 100.

As the ballpoint pen tip 4, a ballpoint pen tip 4 having a coil spring 5 that presses the ball 3 against the inner wall of the tip end T was used (see FIG. 2). The material of the ball 3 was a cemented carbide ball containing tungsten carbide as a main component (and containing cobalt as a binder). The diameter of the ball 3 and the arithmetic average roughness (Ra) of the surface of the ball 3 were each as shown in each of Tables 1 to 4.

The following tests and evaluations were conducted using writing paper of JIS P3201 as the writing test paper.

Writing touch: A sensory test by handwriting was conducted and evaluated.

Very good in smoothness . . . ⊚
    Good in smoothness . . . ○
    Slightly poor in smoothness . . . Δ
    Heavy touch . . . x Blur test (Writability test 1): The writing after the 100 m writing test with a running test machine having a load of 200 gf, a writing angle of 70°, and a writing speed of 4 m/min was observed.

No or few blurs and point unevenness in the writing . . . ⊚
    Slight blurs and point unevenness in the writing, at a practically acceptable level . . . ○
    Blurring and point unevenness in the writing, affecting on practical use . . . Δ
    A lot of blurs and point unevenness in the writing . . . ×

Weeping and blobbing test (Writability test 2): The writing after the 100 m writing test with a running test machine having a load of 200 gf, a writing angle of 70°, and a writing speed of 4 m/min was observed.

No or little weeping and blobbing in the writing . . . ⊚
    Slight weeping and blobbing in the writing, at a practically acceptable level . . . ○
    Weeping and blobbing in the writing, affecting on practical use . . . Δ
    A lot of weeping and blobbing in the writing . . . λ

Ink leakage test: The pen had been left with the pen nib downward for 7 days in an environment of 30° C. and 85% RH, then the ink leakage from the tip end was investigated.

No ink droplets at the tip end . . . ⊚
    Ink droplets present at the tip end are within ¼ of tapered portion . . . ○
    Ink droplet present at the tip end is more than ¼ and less than ½ of tapered portion . . . Δ
    Ink droplets present at the tip end are ½ or more of tapered portion . . . ×

In Examples 1 to 43, good performance was obtained in each of writing touch and the blur test (Writability test 1), the weeping and blobbing test (Writability test 2), and the ink leakage test.

In Examples 30 to 43, a pigment was used as a colorant, and the pigment dispersibility was good and stable. Furthermore, in the investigation of the durability, in each of Examples 30 to 43 in which a pigment was used, the durability was excellent as compared to that in Examples 1 to 29 in which no pigment was used.

Further, the ratio of the ink consumption E mg to the ink consumption F mg (E:F) was measured for the ballpoint pens 100 of Example 1, Example 2, Example 3, Example 16, Example 25, Example 36, Example 37, Example 38, Example 39 and Example 42. As described above, the ink consumption E mg is the ink consumption (mg) from the time point of 0 m to the time point of 100 m at the initial stage of writing. The ink consumption F mg is an ink consumption (mg) from 100 m before the end of ink to the end of ink.

The ratios (E:F) of Example 1, Example 2, Example 3, Example 16, Example 25, Example 36, Example 37, Example 38, Example 39, and Example 42 were 50:52 (1:1.04), 53:54 (1:1.01), 48:45 (1:0.94), 52:56 (1:1.08), 48:44 (1:0.92), 63:57 (1:0.90), 71:66 (1:0.93), 90:87 (1:0.97), 100:95 (1:0.95), 70:65 (1:0.93), respectively.

In addition, the viscosities of the inks in Example 2, Example 3, Example 5, Example 13, Example 30, and Example 31 were measured using a rheometer AR-G2 viscometer (cone plate of 40 mm at an angle of 2°) manufactured by TA Instruments, and the viscosity indices n were calculated.

In Example 2, the ink viscosity=8000 mPa·s under an environment of 20° C. and at a shear rate of $0.18 \ \mathrm{sec}^{-1}$, the ink viscosity=800 mPa·s under an environment of 20° C. and at a shear rate of $100 \ \mathrm{sec}^{-1}$, and the viscosity index n was 0.64.

In Example 3, the ink viscosity=27000 mPa·s under an environment of 20° C. and at a shear rate of $0.18 \ \mathrm{sec}^{-1}$, the ink viscosity=1500 mPa·s under an environment of 20° C. and a shear rate of $100 \ \mathrm{sec}^{-1}$, and the viscosity index n was 0.54.

In Example 5, the ink viscosity=22000 mPa·s under an environment of 20° C. and at a shear rate of $0.18 \ \mathrm{sec}^{-1}$, the ink viscosity=850 mPa·s under an environment of 20° C. and at a shear rate of $100 \ \mathrm{sec}^{-1}$, and the viscosity index n was 0.49.

In Example 13, the ink viscosity=10,000 mPa·s under an environment of 20° C. and at a shear rate of $0.18 \ \mathrm{sec}^{-1}$, the ink viscosity=700 mPa·s under an environment of 20° C. and at a shear rate of $100 \ \mathrm{sec}^{-1}$, and the viscosity index n was 0.58.

In Example 30, the ink viscosity=10,000 mPa·s under an environment of 20° C. and at a shear rate of $0.18 \ \mathrm{sec}^{-1}$, the ink viscosity=700 mPa·s under an environment of 20° C. and at a shear rate of $100 \ \mathrm{sec}^{-1}$, and the viscosity index n was 0.58.

In Example 31, the ink viscosity=4500 mPa·s under an environment of 20° C. and at a shear rate of $0.18 \ \mathrm{sec}^{-1}$, the ink viscosity=550 mPa·s under an environment of 20° C. and at a shear rate of $100 \ \mathrm{sec}^{-1}$, and the viscosity index n was 0.67.

In Examples 1 to 43, good performance was obtained in each of writing touch and the blur test (Writability test 1), the weeping and blobbing test (Writability test 2), and the ink leakage test.

Using the ballpoint pens 100 as the oil-based ballpoint pens of Examples 1 to 43, the ink leakage from the tip end was investigated for the ink leakage suppression by allowing the ballpoint pen to stand with the pen nib downward at an environment of 30° C. and 85% RH, and it was confirmed that the ink leakage from the tip end was at a practically acceptable level.

Using the ballpoint pens 100 as the oil-based ballpoint pens of Examples 1 to 43 and the comparable ballpoint pens, the ink consumption (mg) per writing distance of 100 m was determined by the spiral writing test described above. As a result, the results shown in Tables 1 to 4 were obtained. In addition, the ink consumption per writing distance of 100 m is denoted by A (mg) and the diameter of the ball 3 is denoted by B (mm), and the values of A/B are shown in Tables 1 to 4.

In addition, the displacements of the balls 3 of the ballpoint pens 100 as the oil-based ballpoint pens of Examples 1 to 43 and the comparative ballpoint pens in the extending direction X were measured, and the results shown in Tables 1 to 4 were obtained. In Tables 1 to 4, the "Ball displacement" is the displacement of the ball 3 in the extending direction X.

As shown in Tables 1 to 4, the order of obtaining effect for suppressing ink leakage was Example 25 and Example 26 (triethylene glycol monomethyl ether-acrylic ester resin particles), Example 1 (triethylene glycol monomethyl ether), Example 5 (propylene glycol monomethyl ether), Example 7 (diethylene glycol monobutyl ether), Example 8 (triethylene glycol monobutyl ether).

In Comparative Example 1, alkylene glycol alkyl ethers were not used, and hence the polyacrylic resin was unable to swell and disperse, and sufficient effect was not obtained in the writing touch, weeping and blobbing test (Writability test 2), and ink leakage test.

A polyacrylic resin was not used in Comparative Example 2, and a fatty acid amide wax was used as a shear thinning agent in Comparative Example 3, and as a result, sufficient effects were not obtained in the writing touch, the blur test (Writability test 1), the weeping and blobbing test (Writability test 2), and the ink leakage test.

In Comparative Example 4, alkylene glycol alkyl ethers were not contained, and hence sufficient effects were not obtained in the writing touch, weeping and blobbing test (Writability test 2), and ink leakage test.

In Comparative Example 5, the polyacrylic resin was not contained, and thus sufficient effects were not obtained in the writing touch, the blur test (Writability test 1), the weeping and blobbing test (Writability test 2), and the ink leakage test.

In Comparative Example 6, the ratio of the ink consumption (mg) per writing distance of 100 m to the diameter (mm) of the ball was less than 30, and a sufficient effect was not obtained in the writing touch and blur test (Writability test 1).

Note that in the case of using a retractable writing instrument (retractable ballpoint pen) such as a knock-type retractable writing instrument or a rotary retractable writing instrument, the blurring in handwriting is liable to be affected. For this reason, it is effective to use the ink composition for oil-based ballpoint pen 10 containing the alkylene glycol alkyl ether and the polyacrylic resin as described above.

In order to suppress ink leakage and improve writing performance (blur in handwriting), the ballpoint pen tip 4 preferably includes a valve mechanism. The valve mechanism is a mechanism in which the coil spring 5 directly or via a pressing body presses the ball 3 rotatably held by the tip end T against the inner wall of the tip end edge, whereby a pressing force while writing creates a gap between the inner wall of the tip end edge and the ball 3 to flow out the ink. The valve mechanism preferably closes even a minute gap at the tip end T when not in use.

In the present example, for convenience, as an oil-based ballpoint pen, a direct fill type ballpoint pen 100 directly accommodating the ink composition for oil-based ballpoint pen 10 in the ink container 2 is shown as an example. However, the oil-based ballpoint pen of the present invention may be a writing instrument whose barrel is used as an ink container 2 and directly accommodating the ink composition for oil-based ballpoint pen 10 in the barrel, such as a marking pen or a marker pen.

Alternatively, the oil-based ballpoint pen of the present invention may be a writing instrument in which a ballpoint pen refill directly accommodating the ink composition for oil-based ballpoint pen 10 in an ink container 2 is used as a replacement and attached in a barrel (exterior body).

Furthermore, in the present embodiment, for the sake of convenience, there is exemplified the ballpoint pen tip 4 formed by cutting a wire material, but it may be a ballpoint pen tip 4 formed by pressing a pipe material.

INDUSTRIAL APPLICABILITY

The present invention can be used as a writing instrument. More specifically, the present invention can be widely used as a ballpoint pen such as a cap type, a retractable type writing instrument or the like.

EXPLANATIONS OF LETTERS OR NUMERALS

100 BALLPOINT PEN
10 INK COMPOSITION FOR OIL-BASED BALL-POINT PEN
2 INK CONTAINER
3 BALL
4 BALLPOINT PEN TIP

The invention claimed is:

1. An oil-based ballpoint pen comprising:
an ink container configured to accommodate an ink composition for the oil-based ballpoint pen, the ink composition containing colorant, alkylene glycol alkyl ether, polyacrylic resin, and water; and
a ballpoint pen tip configured to rotatably hold a ball at one end thereof in an extending direction of the ink container, wherein
a ratio of an ink consumption (mg) per writing distance of 100 m to a diameter (mm) of the ball is 30 or more, and
carboxyl group content in the polyacrylic resin is 40% by mass or more and 80% by mass or less
wherein a content of the water based on a total amount of the ink composition is 0.1% by mass or more and 20% by mass or less and
wherein a blending ratio of the water to the polyacrylic resin is 0.1 times or more and 20 times or less on a mass.

2. The oil-based ballpoint pen according to claim 1, wherein the ratio is 150 or less.

3. The oil-based ballpoint pen according to claim 1, wherein the ratio is 65 or more and 100 or less.

4. The oil-based ballpoint pen according to claim 1, wherein a displacement of the ball in the extending direction is more than 3 μm and is 25 μm or less.

5. The oil-based ballpoint pen according to claim 1, wherein the ink consumption (mg) per writing distance of 100 m is more than 20 mg and is 100 mg or less.

6. The oil-based ballpoint pen according to claim 1, wherein the alkylene glycol alkyl ether includes alkylene glycol monoalkyl ether.

7. The oil-based ballpoint pen according to claim 1, wherein an alkylene glycol moiety in the alkylene glycol alkyl ether has three or more and eight or less carbon atoms.

8. The oil-based ballpoint pen according to claim 1, wherein an alkyl ether moiety in the alkylene glycol alkyl ether has one or more and four or less carbon atoms.

9. The oil-based ballpoint pen according to claim 1, wherein the alkylene glycol alkyl ether includes triethylene glycol monomethyl ether.

10. The oil-based ballpoint pen according to claim 1, wherein the alkylene glycol alkyl ether has a solubility parameter (SP value) of 8 $(cal/cm^3)^{1/2}$ or more and 13 $(cal/cm^3)^{1/2}$ or less.

11. The oil-based ballpoint pen according to claim 1, wherein the ink composition for the oil-based ballpoint pen contains surfactant.

12. The oil-based ballpoint pen according to claim 1, wherein the ink composition for the oil-based ballpoint pen contains organic amine.

13. The oil-based ballpoint pen according to claim 1, wherein the ink composition for the oil-based ballpoint pen has a viscosity index n of 0.3 or more and 0.7 or less at 20° C.

14. The oil-based ballpoint pen according to claim 1, wherein a bulk specific gravity of the polyacrylic resin is 0.01 (g/ml) or more and 0.5 (g/ml) or less.

15. The oil-based ballpoint pen according to claim 1, wherein an ink viscosity at 20° C. and a shear rate of 0.18 sec-1 (in the stationary state) is 3000 mPa·s or more and 30,000 mPa·s or less, and an ink viscosity at 20° C. and a shear rate of 100 sec-1 (while writing) is 200 mPa's or more and 3000 mPa·s or less.

\* \* \* \* \*